United States Patent
Ma et al.

(10) Patent No.: US 12,047,806 B2
(45) Date of Patent: Jul. 23, 2024

(54) INTERFACE BETWEEN A RADIO ACCESS NETWORK AND AN APPLICATION

(71) Applicant: QUALCOMM Incorporated, San Diego, CA (US)

(72) Inventors: Liangping Ma, San Diego, CA (US); Nikolai Konrad Leung, San Francisco, CA (US); Alberto Rico Alvarino, San Diego, CA (US); Min Wang, San Diego, CA (US); Thomas Stockhammer, Bergen (DE); Leena Zacharias, San Jose, CA (US); Yong He, San Diego, CA (US); Imed Bouazizi, Frisco, TX (US); Muhammed Zeyd Coban, Carlsbad, CA (US); Umesh Phuyal, San Diego, CA (US); Louis Joseph Kerofsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/653,023

(22) Filed: Mar. 1, 2022

(65) Prior Publication Data
US 2022/0286899 A1   Sep. 8, 2022

Related U.S. Application Data

(60) Provisional application No. 63/157,510, filed on Mar. 5, 2021.

(51) Int. Cl.
*H04W 28/02* (2009.01)
*H04W 24/10* (2009.01)

(52) U.S. Cl.
CPC ....... *H04W 28/0268* (2013.01); *H04W 24/10* (2013.01)

(58) Field of Classification Search
CPC .. H04W 28/0268; H04W 24/10; H04W 24/04
See application file for complete search history.

(56) References Cited

U.S. PATENT DOCUMENTS

| | | | |
|---|---|---|---|
| 2007/0058669 A1* | 3/2007 | Hoffmann | H04L 9/40 370/466 |
| 2014/0153392 A1* | 6/2014 | Gell | H04W 28/0236 370/230 |
| 2019/0132762 A1* | 5/2019 | Zhu | H04B 7/024 |
| 2020/0328983 A1* | 10/2020 | Liu | H04L 69/16 |
| 2022/0046503 A1* | 2/2022 | Kumar | H04W 36/0044 |
| 2023/0052541 A1* | 2/2023 | Lee | H04W 28/12 |

FOREIGN PATENT DOCUMENTS

EP    3179812 A1    6/2017

OTHER PUBLICATIONS

International Search Report and Written Opinion—PCT/US2022/018476—ISA/EPO—May 23, 2022. 19 pages.

* cited by examiner

*Primary Examiner* — Hashim S Bhatti
(74) *Attorney, Agent, or Firm* — The Marbury Law Group, PLLC

(57) ABSTRACT

Various embodiments may provide methods, systems, and devices for supporting application level discovery of Radio Access Network (RAN) statistics and/or events. Various embodiments may provide methods, systems, and devices for supporting application level signaling of Quality of Service (QoS) requirements.

16 Claims, 22 Drawing Sheets

INTERFACE BETWEEN A RADIO ACCESS NETWORK AND AN APPLICATION

RELATED APPLICATIONS

This application claims the benefit of priority to U.S. Provisional Patent Application No. 63/157,510 entitled "INTERFACE BETWEEN A RADIO ACCESS NETWORK AND AN APPLICATION" filed Mar. 5, 2021, the entire contents of which are incorporated herein by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects of the present disclosure include methods, systems, and devices supporting application level discovery of Radio Access Network (RAN) statistics and/or events. Various aspects of the present disclosure include methods, systems, and devices supporting application level signaling of Quality of Service (QoS) requirements between an application processor and a modem processor.

Various aspects include a method performed by a wireless device that may include sending, from an application processor of the wireless device to a modem processor of the wireless device, a query for one or more RAN statistics or events of interest, receiving, at a modem processor, the query for one or more RAN statistics or events of interest from the application processor of the wireless device, generating, by the modem processor, a RAN statistics or events message that may include one or more RAN statistics or events of interest based at least in part on the received query, sending, from the modem processor, the RAN statistics or events message that may include the one or more RAN statistics or events of interest to the application processor, receiving, at the application processor, the RAN statistics or events message from the modem processor, and controlling an output of application data from the application processor to the modem processor based at least in part on the received RAN statistics or events.

In some aspects, the one or more RAN statistics or events of interest may include a delay indication, a delay jitter indication, a packet loss rate, a handover event, a data rate, an available data rate, a recommended bit rate, a radio link failure, a discontinuous reception event, a service interruption, or a loss or delay of an application layer packet of a particular type.

Some aspects may further include receiving in the modem processor from a network device a packet loss report, a packet delay report, a packet delay jitter report, a packet delay variation report, a bit rate report, or a network event message.

Some aspects may further include receiving in the modem processor from a network device a recommended bit rate message including a time interval during which a recommended bit rate is valid.

Some aspects may further include receiving in the modem processor from a network device an uplink (UL) per-packet loss report that indicates a type of lost packet and a sequence number of each lost packet.

Some aspects may further include determining by the application processor Quality of Service (QoS) requirements for an application running on the application processor based at least in part on a model mapping a set of QoS metrics to a Quality of Experience (QoE) associated with a target QoE, sending a QoS requirements message indicating the determined QoS requirements from the application processor to the modem processor, translating, by the modem processor, the QoS requirements indicated in the QoS requirements message to performance metrics, and controlling, by the modem processor, a wireless protocol stack running on the modem processor to implement the performance metrics. Some aspects may further include determining, by the modem processor, whether any of the performance metrics are associated with a network device, and sending, from the modem processor, an indication of performance metrics to the network device in response to determining that any of the performance metrics are associated with the network device. Some aspects may further include determining, by the modem processor, achieved QoS metrics in response to controlling the wireless protocol stack running on the modem processor to implement the performance metrics, and sending, from the modem processor, a response to the application processor of the wireless device indicating the achieved QoS metrics. In some aspects, the QoS requirements indicated in the QoS requirements message may include a volume of data, a maximum bit rate, an average bit rate, a maximum delay, an average delay, a maximum delay jitter, an average of an absolute value of a delay jitter, a maximum packet loss rate, or an average packet loss rate.

Some aspects include a method performed by a first wireless device for managing communications with a remote second wireless device, the method including establishing an application level interface with an application of a second wireless device, obtaining in an application processor of the first wireless device from a modem processor of the first wireless device information regarding one or more RAN statistics or events of interest, and taking an action by the application processor to adapt communications with the second wireless device based on the information regarding one or more RAN statistics or events of interest.

In some aspects, obtaining in an application processor of the first wireless device from a modem processor of the first wireless device information regarding one or more RAN statistics or events of interest may include sending by the application processor via the modem processor to the second wireless device, a RAN information request indicting one or more RAN statistics or events of interest, and receiving, at the application processor via the modem, a RAN statistics or events message including one or more RAN statistics or events of interest from the second wireless device, and taking an action by the application processor to adapt communications with the second wireless device based on the information regarding one or more RAN statistics or events of interest includes controlling, by the application processor, an output of application data from the application processor based at least in part on the received RAN statistics or events.

In some aspects, the one or more RAN statistics or events of interest may include a delay indication, a delay jitter indication, a packet loss rate, a handover event, a data rate, an available data rate, a recommended bit rate, a radio link failure, a discontinuous reception event, a service interruption, or a loss or delay of an application layer packet of a particular type.

In some aspects, the one or more RAN statistics or events of interest may include QoS requirements for an application running on an application processor of the second wireless device, the QoS requirements including a volume of data, a maximum bit rate, an average bit rate, a maximum delay, an average delay, a maximum delay jitter, an average of an absolute value of a delay jitter, a maximum packet loss rate, or an average packet loss rate.

In some aspects, obtaining in an application processor of the first wireless device from a modem processor of the first wireless device information regarding one or more RAN statistics or events of interest may include receiving, in the application processor via the modem processor, a RAN information request from the second wireless device, the RAN information request indicting one or more RAN statistics or events of interest, sending, from the application processor to the modem processor, a query for the one or more RAN statistics or events of interest, and receiving, by the application processor from the modem processor, a RAN statistics or events message including one or more RAN statistics or events of interest, and taking an action by the application processor to adapt communications with the second wireless device based of the information regarding one or more RAN statistics or events of interest includes sending, from the application processor via the modem processor to the second wireless device, a RAN statistics or events message including the one or more RAN statistics or events of interest.

In some aspects, the one or more RAN statistics or events of interest may include a delay indication, a delay jitter indication, a packet loss rate, a handover event, a data rate, an available data rate, a recommended bit rate, a radio link failure, a discontinuous reception event, a service interruption or a loss or delay of an application layer packet of a particular type.

In some aspects, the one or more RAN statistics or events of interest may include QoS requirements for an application running on an application processor of the second wireless device, the QoS requirements including a volume of data, a maximum bit rate, an average bit rate, a maximum delay, an average delay, a maximum delay jitter, an average of an absolute value of a delay jitter, a maximum packet loss rate, or an average packet loss rate.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above. Further aspects may include a network device having a processor configured to perform one or more operations of any of the methods summarized above. Further aspects may include a non-transitory processor-readable storage medium having stored thereon processor-executable instructions configured to cause a processor of a network device to perform operations of any of the methods summarized above. Further aspects include a network device having means for performing functions of any of the methods summarized above. Further aspects include a system on chip for use in a network device that includes a processor configured to perform one or more operations of any of the methods summarized above. Further aspects include a system in a package that includes two systems on chip for use in a network device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
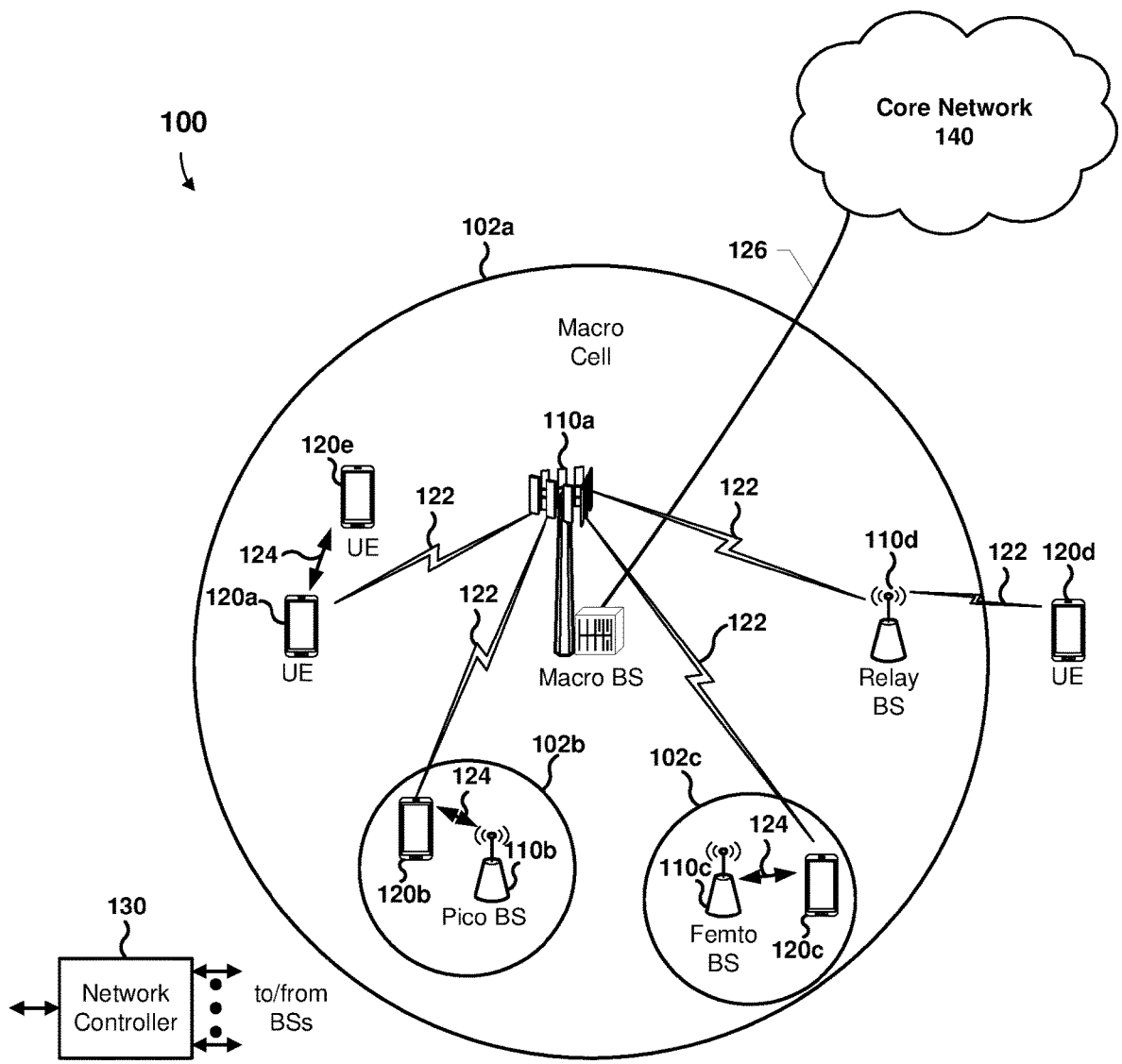
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods that may be implemented in a wireless device and/or network device or network node (e.g., a base station) for supporting application level discovery of Radio Access Network (RAN) statistics and/or events. Some embodiments provide methods that may be implemented in a wireless device and/or network device for supporting application level signaling of Quality of Service (QoS) requirements. Some embodiments may enable an application running on an application processor of a wireless device to be made aware of RAN statistics and/or events. Some embodiments may enable an application running on an application processor of a wireless device to set QoS requirements for a wireless protocol stack running on a modem processor of the wireless device, a network device, and/or a remote wireless device. Some embodiments may enable an application running on an application processor of a wireless device to account for handover in a RAN. As an example, some embodiments may enable an application running on an application processor of a wireless device to avoid packet loss when a RAN capacity drops to zero during a handover event. As another example, some embodiments may enable an application running on an application processor of a wireless device to increase a transmission rate after a handover event completes without needing to wait to determine whether a capacity increase has occurred.

The terms "wireless device" and "wireless computing device" are used interchangeably herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, wireless devices affixed to or incorporated into various mobile platforms, and similar electronic devices that include a memory, multiple SIMs, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms subscriber identity module (SIM) and "SIM card" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM wireless device", "MS wireless device", "dual-SIM wireless device", and "DS wireless device" may interchangeably describe a wireless device that is configured with more than one SIM. Examples of multi-SIM wireless devices include multi-SIM multi-standby (MSMS) wireless devices, such as Dual-SIM (DS) dual-standby (DSDS) wireless devices, etc., and multi-SIM multi-active (MSMA) wireless devices, such as Dual-SIM dual-active (DSDA) wireless devices, etc. An MSMS wireless device may be a wireless device that is configured with more than one SIM and allows idle-mode operations to be performed on two subscriptions simultaneously, as well as selective communication on one subscription while performing idle-mode operations on at least one other subscription. An MSMA wireless device may be a wireless device that is configured with more than one SIM and allows idle-mode and/or active mode operations to be performed on two subscriptions simultaneously using at least two different radio frequency (RF) resources (e.g., two different wireless transceivers).

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area.

Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via network devices or network nodes, such as NR base stations, Next Generation NodeB (gNodeBs or gNBs)), and the like. The 5G systems and NR network devices are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices or network nodes, such as base stations, may broadcast packets to wireless devices in a cell. For ease of reference, the term "network device" or "network node" is used to refer to any of a variety of network elements that may perform operations of various embodiments, non-limiting examples of which include a base station, an eNodeB, a gNodeB, etc. A network device may provision services to wireless devices in a cell using data radio bearers (DRBs).

In some wireless networks, such as 5G networks, Quality of Service (QoS) settings may be customizable on a per wireless device basis. For example, in a 5G network, a Network Exposure Function (NEF) interface of a 5G core network may support a wireless device signaling QoS requirements to an Application Function (AF) server of the 5G core network and the AF server signaling network statistics and/or events to the wireless device. In such networks, QoS settings for a wireless device may be signaled from the core network, such as a 5G core network, to a radio access network (RAN) network supporting that wireless device. The QoS settings may be implemented by the RAN network. While the signaling of QoS settings from the core network to the RAN network supporting the wireless device may enable the RAN network to implement QoS settings specific to the wireless device, the delay resulting from wireless device to core network signaling and then core network to RAN network signaling can be too large to meet desired QoS requirements for the wireless device. Additionally, such networks may not provide for any signaling of QoS requirements between different wireless devices. As such, two wireless devices in communication with one another, such as over a set of RAN networks and core networks communicating via the Internet, may not communicate QoS requirements along the end-to-end (e2e) path with one another Wireless devices communicating in a wireless network may experience packet loss and delay for reasons different than those experienced in wired networks. While both wireless and wired networks may experience packet loss due to network congestion, wireless networks may also experience packet loss resulting from RAN problems, such as beam failures, radio link failures, unacceptable Block Error Ratios (BLERs), unacceptable Code Block Group (CBG) error rates, Modulation and Coding Scheme (MCS) table differences between enhanced Mobile Broad Band (eMBB) and Ultra-reliable low-latency communication (URLLC), hybrid automatic repeat request (HARQ) retransmission failures, radio link control (RLC) retransmission failures, and Packet Data Convergence Protocol (PDCP) retransmission failures. Similarly, while both wireless and wired networks may experience delay due to transmission delay, propagation delay, and/or queuing delay, wireless networks may also experience delay resulting from Medium Access Control (MAC) scheduling, logical channel prioritization, HARQ retransmission, RLC retransmission, and PDCP retransmission.

As wireless networks and wired networks may experience packet loss and delay for different reasons, congestion control algorithms created for use in wired networks may not work well in wireless network scenarios. For example, applications created according to the Web Real-Time Communication (WebRTC) project using WebRTC's congestion control algorithm sending packets over a wireless network may incorrectly interpret packet loss as signal congestion, may incorrectly interpret delay as signal congestion, may be slow to react to wireless network events, may send rate reduction requests too slowly during wireless network handover operations, and may send rate increase requests to slowly after a wireless network handover operation.

Various embodiments may provide an interface for RAN characteristics reporting between a modem processor of a wireless device and an application running on an application processor of the wireless device. Some embodiments may enable visibility of application level QoS requirements to be provided to a network device or network node of a RAN, such as a gNB, by a wireless device. Some embodiments may enable RAN statistics and/or events to be provided to an application running on an application processor of a wireless device. Some embodiments may provide for QoS requirement and RAN statistics and/or events reporting visibility between a network device or network node of a RAN, such as a gNB, and an application running on an application processor of a wireless device. In some embodiments, a modem processor of a wireless device may interface with an application running an application processor of the wireless device to exchange RAN and/or QoS related indications, such as via an Application Programing Interface (API) or other communication pathway between the application and one or more modules of the modem processor.

In some embodiments, a modem processor of a wireless device may report RAN statistics and/or events to an application running on an application processor of the wireless device. For example, a RAN reporting module of a modem processor of a wireless device may send messages including indications of RAN statistics and/or events to a communication application, such as a WebRTC application, a media streaming application, messaging application, videotelephone application, or other type application, running on an application processor of the wireless device. As examples, the RAN statistics and/or events may include delay indications, delay jitter indications, packet loss rate being experienced, a handover status (e.g., handover started, handover completed, etc.), and/or a RAN data rate.

In some embodiments, an application running on an application processor of a wireless device may send QoS requirements to a modem processor of the wireless device. For example, a communication application, such as a WebRTC application, a media streaming application, messaging application, videotelephone application, or other type application, running on an application processor of a wireless device may send indications of QoS requirements for the communication application. As examples, QoS requirements may include traffic prioritization requirements, desired delay indications, and/or desired delay jitter indications. In some embodiments, QoS requirements may be determined at least in part using a model mapping a set of QoS metrics to a Quality of Experience (QoE) associated with a target QoE. As an example, the QoE may be measured by a mean opinion score (MOS).

In various embodiments, information obtained by the application processor from the modem processor may enable the application processor to take an action to adjust, adapt or manage processes in response to the RAN statistics and/or events information. For example, the application processor may slow or suspend the output of data for transmission by the modem in response to RAN statistics and/or events information that a communication link is slow, stalled or interrupted. As another example, the application processor may adjust the output of data for transmission by the processor in response to QoS information. As another example, the application processor may adjust the processing of data or rendering images to maintain a target QoE in view of achievable data transmission rates based on the QoS information.

As a specific example, during a handover event when a wireless device is attempting to switch from one network device or network node to another network device or network node (e.g., from one gNB to another gNB), the capacity of the RAN may drop to zero. Any data packets sent by the application to a modem processor for transport via a RAN may be lost and/or delayed while the RAN capacity is zero during handover. An application without visibility into the handover event occurring may take a long time to determine the RAN capacity has dropped to zero and may experience undesired delay and/or packet loss before the RAN capacity loss during handover is detected.

Some embodiments may enable a modem processor of a wireless device to signal to an application (e.g., a communication application, such as a WebRTC application, a media streaming application, messaging application, videotelephone application, etc., or other type application) running on an application processor of the wireless device that a handover event is occurring. In some embodiments, the application processor may take an action in response to the information that a handover event is occurring, such as the application processor of the wireless device may control the application running on the application processor to stop sending data packets to the modem processor during the handover.

As another specific example, after a wireless device completes handover, an application without visibility into the handover event being completed may take a long time to determine the RAN capacity has increased. As the application without visibility into the handover event being completed may take a long time to determine RAN capacity has increased, the application without visibility into the handover event being completed may take a long time to ramp up its data transmission to a modem processor of the wireless device. As such, the application without visibility into the handover event being completed may fail to use increased RAN capacity right after handover completes.

Some embodiments may enable a modem processor of a wireless device to signal to an application (e.g., a communication application, such as a WebRTC application, a media streaming application, a messaging application, a videotelephone application, etc., or other type application) running on an application processor of the wireless device that a handover event has completed and/or that data transmission rate can be increased. In some embodiments, the application processor of the wireless device may take an action in response to the information that a handover event has completed and/or that data transmission rate can be increased, such as increasing the data transmission rate to the modem processor.

Some embodiments may provide an interface for RAN characteristics reporting between two wireless devices communicating over a wireless communication path. In some embodiments, the wireless communication path may be established such that each of the two wireless devices is connected to its own respective RAN. Some embodiments may enable visibility of application level QoS requirements to be provided from one wireless device to another wireless device. Some embodiments may enable RAN statistics and/or events to be provided from a local application running on a local application processor of a first wireless device to a remote application running on a remote application processor of a remote wireless device. Some embodiments may provide for QoS requirement and RAN statistics and/or events reporting visibility between applications running on application processors of two separate wireless devices communication over a wireless communication path, such as a wireless communication path including a respective RAN for each of the two separate wireless devices. Some embodiments may enable a local application processor of a first wireless device to pull RAN statistics and/or events from a remote application running on a remote application processor of a remote second wireless device. Some embodiments may enable a local application processor of a first wireless device to push QoS requirements to a remote application running on a remote application processor of a remote second wireless device.

As a specific example, a first wireless device may be sending data packets via a wireless communication path to a remote second wireless device. In the wireless communication path between the first and second wireless devices, the first wireless device may be connected to a first RAN, the first RAN may be connected to a first 5G core network, the first 5G core network may be connected to the Internet, a second 5G core network may be connected to the Internet, the second 5G core network may be connected to a second RAN, and the second RAN connected to the second wireless device. During a handover event when the second wireless device is attempting to switch from one network device or network node to another network device or network node (e.g., from one base station or gNB to another base station or gNB), the capacity of the RAN at the second wireless device may drop to zero. Any data packets sent by the first wireless device to the second wireless device may be lost or delayed. An application on the first wireless device without visibility into the handover event occurring at the second wireless device may take a long time to determine the second wireless device's RAN capacity has dropped to zero and may experience undesired delay and/or packet loss before the RAN capacity loss during handover at the second wireless device is detected.

Some embodiments may enable an application (e.g., a communication application, such as a WebRTC application, a media streaming application, a messaging application, a videotelephone application, etc., or other type application) running on an application processor of the second wireless device to signal to the first wireless device that a handover event is occurring at the second wireless device. In some embodiments, an application (e.g., a communication application, such as a WebRTC application, a media streaming application, a messaging application, a videotelephone application, etc., or other type application) running on an application processor of the first wireless device may stop sending data packets to the second wireless device in response to receiving the indication the handover is occurring.

Continuing with the previous specific example, after the second wireless device completes handover, an application on the first wireless device without visibility into the handover event being completed by the second wireless device may take a long time to determine the RAN capacity at the second wireless device has increased. As the application on the first wireless device without visibility into the handover event being completed may take a long time to determine the RAN capacity at the second wireless device has increased, the application on the first wireless device without visibility into the handover event being completed may take a long time to ramp up its data transmission to the second wireless device. As such, the application on the first wireless device without visibility into the handover event being completed may fail to use increased RAN capacity of the second wireless device right after handover completes.

Some embodiments may enable an application (e.g., a communication application, such as a WebRTC application, a media streaming application, a messaging application, a videotelephone application, etc., or other type application) running on an application processor of the second wireless device to signal to the first wireless device that a handover event has completed and/or that data transmission rate can be increased. In some embodiments, the application (e.g., a communication application, such as a WebRTC application, a media streaming application, a messaging application, a videotelephone application, etc., or other type application) running on an application processor of the first wireless device may increase the data transmission rate to the second wireless device in response to receiving the indication that a handover event has completed and/or that data transmission rate can be increased.

In some embodiments, a wireless protocol stack of a modem processor of a wireless device may send information about RAN statistics and/or events to an application (e.g., a communication application, such as a WebRTC application, a media streaming application, a messaging application, a videotelephone application, etc., or other type application) running on an application processor of the wireless device. In some embodiments, a wireless protocol stack of a modem processor of a wireless device may send information about RAN statistics and/or events to an application (e.g., a communication application, such as a WebRTC application, a media streaming application, a messaging application, a videotelephone application, etc., or other type application) running on an application processor of the wireless device periodically. For example, the application (e.g., a communication application, such as a WebRTC application, a media streaming application, a messaging application, a videotelephone application, etc., or other type application) running on the application processor of the wireless device may register for one or more types of RAN statistics and/or events and may indicate a periodicity of often those RAN statistics and/or events are to be reported.

The wireless protocol stack of a modem processor of a wireless device may send information about the registered RAN statistics and/or events at the indicated periodicity. In some embodiments, a wireless protocol stack of a modem processor of a wireless device may send information about RAN statistics and/or events to an application (e.g., a communication application, such as a WebRTC application, a media streaming application, a messaging application, a videotelephone application, etc., or other type application) running on an application processor of the wireless device on-demand. For example, the application (e.g., a communication application, such as a WebRTC application, a media streaming application, a messaging application, a videotelephone application, etc., or other type application) running on the application processor of the wireless device may send a query for one or more types of RAN statistics and/or events and the wireless protocol stack of a modem processor of a wireless device may respond with information about the queried RAN statistics and/or events in response to the query.

In some embodiments, RAN statistics may be attributes associated with the wireless connection(s) between the modem processor of the wireless device and a network device or network node of the RAN, such as gNB, eNB, AP, etc. As an example, a RAN statistic may be a packet loss rate. As an example, a RAN statistic may be a packet delay. As an example, RAN statistic may be a packet delay jitter and/or variation. As an example, a RAN statistic may be a data rate. As a specific example, the data rate may be the measured data rate for the uplink (UL) and/or the downlink (DL) connection with the network device or network node of the RAN, such as gNB, eNB, AP, etc. The data rate may be a raw data rate and/or smooth data rate (e.g., a data rate computed with a smoothing factor). The data rate may include the time interval over which the data rate was computed. As an example, a RAN statistic may be an available data rate. The available data rate may be for the UL or DL. The available data rate may be based on the observed past data rate and the resource allocation for a future period. The available data rate may be computed locally by the modem processor of the wireless device. The available data rate may be computed by the network device or network node of the RAN, such as gNB, eNB, AP, etc., and signaled to the modem processor of the wireless device.

The available data rate may include an indication of a time period for which the available data rate may be assumed valid (e.g., a time-to-live (TTL) value, etc.) As an example, a RAN statistic may be a recommended bit rate. In some embodiments, the RAN statistics may be associated with one or more different protocol data units (PDUs) (or transport blocks) of the wireless protocol stack. For example, RAN statistics may be associated with one or more of Service Data Adaptation (SDAP) PDUs, Packet Data Convergence Protocol (PDCP) PDUs, Radio Link Control (RLC) PDUs, Media Access Control (MAC) PDUs, etc. As specific examples, RAN statistics may be associated with SDAP PDUs, PDCP PDUs, RLC PDUs, and/or MAC PDUs for 5G NR RANs, PDCP PDUs, RLC PDUs, and/or MAC PDUs for LTE RANs, and MAC PDUs for WiFi RANs.

One or more RAN statistics may be communicated from a wireless protocol stack of a modem processor of a wireless device to an application (e.g., a communication application, such as a WebRTC application, a media streaming application, a messaging application, a videotelephone application, etc., or other type application) running on an application processor of the wireless device. As an example, each RAN statistic may be sent in its own respective message from the wireless protocol stack of the modem processor of the wireless device to the application (e.g., a communication application, such as a WebRTC application, a media streaming application, a messaging application, a videotelephone application, etc., or other type application) running on the application processor of the wireless device. As another example, multiple different RAN statistics may be sent in a message from the wireless protocol stack of the modem processor of the wireless device to the application (e.g., a communication application, such as a WebRTC application, a media streaming application, a messaging application, a videotelephone application, etc., or other type application) running on the application processor of the wireless device.

In some embodiments, RAN events may be events associated with the wireless connection(s) between the modem processor of the wireless device and a network device or network node of the RAN, such as gNB, eNB, AP, etc. In some embodiments, indications of RAN events may be sent from a wireless protocol stack of a modem processor of a wireless device to an application (e.g., a communication application, such as a WebRTC application, a media streaming application, a messaging application, a videotelephone application, etc., or other type application) running on an application processor of the wireless device. As an example, a RAN event may be a handover event. As specific examples, an indication of a RAN event may be an indication that a handover has started, a handover has completed, etc. As an example, a RAN event may be a radio link failure. As specific examples, an indication of a RAN event may be an indication that a radio link failed, that a radio link was established, etc. As an example, a RAN event may be a discontinuous reception (DRX). As specific examples, an indication of a RAN event may be an indication of a DRX time to sleep, a DRX time to wake up, etc. As an example, a RAN event may be a service interruption. As specific examples, an indication of a RAN event may be an indication of a start time of a service interruption, an expected time to restore service, etc.

As an example, a RAN event may be a loss or delay of an application layer packet of a particular type. In some embodiments, a wireless protocol stack of a modem processor of a wireless device may store an indication of a mapping of application layer packets (e.g., Real-Time Transport (RTP) packets) to the PDUs of the various layers, such as IP, SDAP, PDCP, MAC, PHY, etc., that the application layer packets are associated with as the application layer packets are prepared for transmission by the wireless device. The wireless protocol stack of the modem processor of the wireless device may compare an indication of a lost and/or delayed protocol data unit (PDU) to the stored mapping of the application layer packets to determine the application layer packet mapped to the lost and/or delayed PDU. In some embodiments, the wireless protocol stack of the modem processor of the wireless device may report the loss of an application layer packet based on the loss of a PDU to which the application layer packet may be mapped. In some embodiments, the wireless protocol stack of the modem processor of the wireless device may report the delay of an application layer packet based on the delay of a PDU to which the application layer packet may be mapped.

One or more RAN events may be communicated from a wireless protocol stack of a modem processor of a wireless device to an application (e.g., a communication application, such as a WebRTC application, a media streaming application, a messaging application, a videotelephone application, etc., or other type application) running on an application processor of the wireless device. As an example, each RAN event may be sent in its own respective message from the wireless protocol stack of the modem processor of the wireless device to the application (e.g., a communication application, such as a WebRTC application, a media streaming application, a messaging application, a videotelephone application, etc., or other type application) running on the application processor of the wireless device. As another example, multiple different RAN events may be sent in a message from the wireless protocol stack of the modem processor of the wireless device to the application (e.g., a communication application, such as a WebRTC application, a media streaming application, a messaging application, a videotelephone application, etc., or other type application) running on the application processor of the wireless device. As a further example, one or more different RAN events and/or one or more different RAN statistics may be sent in a message from the wireless protocol stack of the modem processor of the wireless device to the application (e.g., a communication application, such as a WebRTC application, a media streaming application, a messaging application, a videotelephone application, etc., or other type application) running on the application processor of the wireless device.

In some embodiments, a modem processor of a wireless device may receive a message, such as a report, MAC Control Element (CE) (MAC CE), other type message, etc., from a network device or network node of the RAN, such as gNB, eNB, AP, etc. The received message may include indications associated with one or more RAN statistics and/or events. In some embodiments, the modem processor of the wireless device may process the received message, such as a report, MAC Control Element (CE) (MAC CE), other type message, etc., and/or the modem processor may locally observe one or more RAN statistics and/or events. In some embodiments, the modem processor of the wireless device may generate one or more report indicating information from the received message and/or locally observed RAN statistics and/or events and may send the one or more reports to an application (e.g., a communication application, such as a WebRTC application, a media streaming application, a messaging application, a videotelephone application, etc., or other type application) running on the application processor of the wireless device.

In some embodiments, a network device or network node of the RAN, such as gNB, eNB, AP, etc., may send a message, such as a report, MAC Control Element (CE) (MAC CE), other type message, etc., to a modem processor of a wireless device including a packet loss report. As an example, the message may be a Packet Loss Report MAC CE. The message including the packet loss report may include a Logical Channel Identifier (ID) (LCID) field identifying the logical channel to which the packet loss report is applicable.

The message including the packet loss report may include a field indicating the format of the packet loss rate. The format may indicate the format of the loss rate of the MAC PDUs. The format may be raw or smooth. As an example, when the format of the loss rate is raw, an additional field indicating the time period over which the packet loss rate was calculated may be included. As an example, when the format of the loss rate is smoothed, a first additional field indicating the time period over which the packet loss rate is calculated may be included and a second additional field indicating how the smoothing was applied to the packet loss rate may be included. As a specific example, a smoothing factor in an exponential weighted moving average may be indicated.

The message including the packet loss report may include a field indicating a packet loss rate index that indicates a packet loss rate range in a table (e.g., 000 may indicate a packet loss rate greater than $1 \times 10^{-1}$). The number of bits assigned to the packet loss rate index may control the granularity of the table, with larger numbers of available bits enabling finer granularity. The message including the packet loss report may include a field indicating the UL or the DL thereby indicating whether the packet loss is for the UL or the DL.

In some embodiments, a network device or network node of the RAN, such as gNB, eNB, AP, etc., may send a message, such as a report, MAC CE, other type message, etc., to a modem processor of a wireless device including a packet delay report. As an example, the message may be a Packet Delay Report MAC CE. The message including the packet delay report may include may include a logical channel identifier (LCID) field identifying the logical channel to which the packet delay report is applicable.

The message including packet delay report may include a field indicating the format of the packet delay. The format may indicate the format of the packet delay of the MAC PDUs. The format may be raw or smooth. As an example, when the format of the packet delay is raw, an additional field indicating the time period over which the packet delay was averaged may be included. As an example, when the format of the packet delay is smoothed, a first additional field indicating the time period over which the packet delay is calculated may be included and a second additional field indicating how the smoothing was applied to the packet delay may be included. As a specific example, a smoothing factor in an exponential weighted moving average may be indicated.

The message including the packet delay report may include a field indicating a packet delay index that indicates a packet delay range in a table (e.g., 000 may indicate a packet delay of greater than 200 milliseconds). The message including the packet delay report may include a field indicating the UL or the DL thereby indicating whether the packet delay is for the UL or the DL.

In some embodiments, a network device or network node of the RAN, such as gNB, eNB, AP, etc., may send a message, such as a report, MAC CE, other type message, etc., to a modem processor of a wireless device including a packet delay jitter and/or variation report. As an example, the message may be a Packet Delay Jitter/Variation Report MAC CE. The message including the packet delay jitter and/or variation report may include may include a LCID field identifying the logical channel to which the packet loss report is applicable. The message including the packet delay jitter and/or variation report may include a field indicting a type of the jitter and/or variation, such as jitter or standard deviation. For example, the jitter may be defined as the absolute value of the time difference between two adjacent packets.

The message including the packet delay jitter and/or variation report may include a field indicating the format of the packet delay jitter and/or variation. The format may indicate the format of the packet delay jitter and/or variation of the MAC PDUs. The format may be raw or smooth. As an example, when the format of the packet delay jitter and/or variation is raw, an additional field indicating the time period over which the packet delay jitter and/or variation was averaged may be included. As an example, when the format of the packet delay jitter and/or variation is smoothed, a first additional field indicating the time period over which the packet delay jitter and/or variation is calculated may be included and a second additional field indicating how the smoothing was applied to the packet delay jitter and/or variation may be included. As a specific example, a smoothing factor in an exponential weighted moving average may be indicated.

The message including the packet delay jitter and/or variation report may include a field indicating a packet delay jitter and/or variation index that indicates a packet delay jitter and/or variation in a table. The message including the packet delay jitter and/or variation report may include a field indicating the UL or the DL thereby indicating whether the packet delay jitter and/or variation is for the UL or the DL.

In some embodiments, a network device or network node of the RAN, such as gNB, eNB, AP, etc., may send a message, such as a report, MAC CE, other type message, etc., to a modem processor of a wireless device including a bit rate report. As an example, the message may be a Bit Rate Report MAC CE.

The message including the bit rate report may include may include a LCID field identifying the logical channel to which the bit rate report is applicable. The message including bit rate report may include a field indicating the type of the bit rate. The type may indicate the type of the bit rate of the MAC PDUs. The type may be raw or smooth. As an example, when the type of the bit rate is raw, an additional field indicating the time period over which the bit rate was averaged may be included. As an example, when the type of the bit rate is smoothed, a first additional field indicating the time period over which the bit rate is calculated may be included and a second additional field indicating how the smoothing was applied to the bit rate may be included. As a specific example, a smoothing factor in an exponential weighted moving average may be indicated.

The message including the bit rate report may include a field indicating a bit rate index that indicates a bit rate range, or a bit rate, in a table (e.g., an index of 2 may indicate a bit rate greater than 9 kilobits per second). The number of bits assigned to the bit rate index may control the granularity of the table, with larger numbers of available bits enabling finer granularity. The message including the bit rate report may include a field indicating the UL or the DL thereby indicating whether the bit rate is for the UL or the DL.

In some embodiments, a network device or network node of the RAN, such as gNB, eNB, AP, etc., may send a message, such as a report, MAC CE, other type message, etc., to a modem processor of a wireless device including a recommended bit rate. As an example, the message may be a Recommended Bit Rate MAC CE. The message including the recommended bit rate may include may include a LCID field identifying the logical channel to which the recommended bit rate is applicable. The message including the recommended bit rate may include a field indicating the UL or the DL thereby indicating whether the recommended bit rate is for the UL or the DL. The message including the recommended bit rate may include a field pointing to an index in a table that maps the index to a recommended bit rate. The message including the recommended bit rate may include a bit rate multiplier field that indicates a scaling factor which is applied to the recommended bit rate. The message including the recommended bit rate may include a time interval field indicating a time interval during which the wireless device may assume that the recommended bit rate is valid.

In some embodiments, a network device or network node of the RAN, such as gNB, eNB, AP, etc., may send a message, such as a report, MAC CE, other type message, etc., to a modem processor of a wireless device including a network event indication. As an example, the message may be a Network Event MAC CE. The message including the network event indication may include may include a LCID field identifying the logical channel to which the network event indication is applicable. The message including the network event indication may include an event type field. As an example, the event type field may be an indication that handover starts and optionally the expected time for the handover procedure to complete. As another example, the event type field may be an indication that radio link failure starts and optionally the expected time before the radio like failure may be recovered. As another example, the event type field may be an indication that a radio link is recovered.

In some embodiments, a network device or network node of the RAN, such as gNB, eNB, AP, etc., may send a message, such as a report, MAC CE, RLC message, PDCP message, other type message, etc., to a modem processor of a wireless device including a UL per-packet loss report. The UL per-packet loss report may provide information about packet losses in the UL. The message including the UL per-packet loss report may include a field indicating the length of the UL per-packet loss report which may carry information of a variable number of lost packets. The message including the UL per-packet loss report may identify a sequency of lost packets. For each lost packet the UL per-packet loss report may indicated the RLC sequence number and/or the PDCP sequence number. For each lost packet the UL per-packet loss report may indicate the RLC bearer which may identify the associated logical channel of the lost packet. For each lost packet the UL per-packet loss report may indicate the PDCP entity which may identify the associated radio bearer of the lost packet.

In some embodiments, an application (e.g., a communication application, such as a WebRTC application, a media streaming application, a messaging application, a videotelephone application, etc., or other type application) running on an application processor of a wireless device may send a network statistics query to a modem processor of the wireless device. For example, an application (e.g., a communication application, such as a WebRTC application, a media streaming application, a messaging application, a videotelephone application, etc., or other type application) running on an application processor of a wireless device may send a statistics query to a wireless protocol stack of a modem processor of the wireless device. In some embodiments, a statistics query may indicate a type of a report the application (e.g., a communication application, such as a WebRTC application, a media streaming application, a messaging application, a videotelephone application, etc., or other type application) running on an application processor of a wireless device may be requesting.

In some embodiments, a statistics query may indicate one or more statistics that a wireless protocol stack of a modem processor of a wireless device is to include in a report sent to the application (e.g., a communication application, such as a WebRTC application, a media streaming application, a messaging application, a videotelephone application, etc., or other type application) running on the application processor of the wireless device. As examples, the queried statistics may include: packet loss rate; packet delay; packet delay jitter and/or variation; data rate (e.g., the data rate measured for the UL and/or DL, optionally including the format of the data rate, such as raw, smoothed, etc., and the time interval over which the data rate is computed and/or any smoothing factor); available data rate; and/or recommended bit rate. In some embodiments, a statistics query may indicate the requested frequency of reporting from the modem processor to the application (e.g., a communication application, such as a WebRTC application, a media streaming application, a messaging application, a videotelephone application, etc., or other type application) running on the application processor of the wireless device, such as requesting the modem processor report the queried statistics once every 100 milliseconds, etc.

In some embodiments, an application (e.g., a communication application, such as a WebRTC application, a media streaming application, a messaging application, a videotelephone application, etc., or other type application) running on an application processor of a wireless device may send a QoS requirements to a modem processor of the wireless device. For example, an application (e.g., a communication application, such as a WebRTC application, a media streaming application, a messaging application, a videotelephone application, etc., or other type application) running on an application processor of a wireless device may send an indication of QoS requirements for the application to a wireless protocol stack of a modem processor of the wireless device. As examples, the QoS requirements may include one or more of: volume of the data; maximum bit rate; average bit rate; maximum delay; average delay; maximum delay jitter; average of the absolute value of the delay jitter; maximum packet loss rate; and/or average packet loss rate. In some embodiments, QoS requirements may be determined at least in part using a model mapping a set of QoS metrics to a QoE associated with a target QoE. As an example, the QoE may be measured by a mean opinion score MOS.

In some embodiments, a modem processor of the wireless device may translate the QoS requirements received from the application (e.g., a communication application, such as a WebRTC application, a media streaming application, a messaging application, a videotelephone application, etc., or other type application) running on an application processor of the wireless device into performance metrics for the various layers of the wireless protocol stack (e.g., performance metrics for a SDAP layer, PDCP layer, RLC layer, MAC layer, PHY layer, etc.). In some embodiments, the modem processor of the wireless device may send one or more of the performance metrics to a network device or network node of the RAN, such as gNB, eNB, AP, etc.

In some embodiments, the network device or network node of the RAN, such as gNB, eNB, AP, etc., may accept or reject one or more of any performance metrics sent by the modem processor of the wireless device, for example based on network device or network node capabilities and/or resource availability. In some embodiments, the network device or network node of the RAN, such as gNB, eNB, AP, etc., may allocate resources based at least in part on the performance metrics.

In some embodiments, the modem processor of the wireless device may perform logical channel prioritization based on the performance metrics. In some embodiments, the modem processor of the wireless device may indicate to the application (e.g., a communication application, such as a WebRTC application, a media streaming application, a messaging application, a videotelephone application, etc., or other type application) running on the application processor of the wireless device whether one or more of the QoS requirements may be met by the modem processor and/or the network device or network node of the RAN, such as gNB, eNB, AP, etc.

In some embodiments, the modem processor of the wireless device may indicate to the application (e.g., a communication application, such as a WebRTC application, a media streaming application, a messaging application, a videotelephone application, etc., or other type application) running on the application processor of the wireless device the achieved QoS metrics of the modem processor and/or the network device or network node of the RAN, such as gNB, eNB, AP, etc., such as achieved bit rate, delay, delay jitter, packet loss, etc.

Some embodiments may enable a first application (e.g., a communication application, such as a WebRTC application, a media streaming application, a messaging application, a videotelephone application, etc., or other type application) running on a first application processor of a first wireless device to receive RAN statistics and/or events from a second application (e.g., a communication application, such as a WebRTC application, a media streaming application, a messaging application, a videotelephone application, etc., or other type application) running on a second application processor of a second wireless device. The RAN statistics and/or events from the second application may be RAN statistics and/or events associated with the wireless connections between the second wireless device and a RAN different from a RAN to which the first wireless device is connected.

In some embodiments, a first application (e.g., a communication application, such as a WebRTC application, a media streaming application, a messaging application, a videotelephone application, etc., or other type application) running on a first application processor of a first wireless device may send a request, such as a RAN information request, to a second application (e.g., a communication application, such as a WebRTC application, a media streaming application, a messaging application, a videotelephone application, etc., or other type application) running on a second application processor of a second wireless device. The RAN information request may be a query asking whether the second wireless device is on a RAN and, if on a RAN, a request to provide the type of the RAN (e.g., LTE, 5G NR, WiFi, etc.), and a request for statistics and/or reporting of events for that RAN of the second wireless device.

In some embodiments, the second application may report the RAN statistics and/or events back to the first application periodically and/or on-demand in response to a query. Example RAN statistics and/or events that may be reported by the second application to the first application may include packet loss rate, packet delay, packet delay jitter and/or variation, data rate, available data rate, recommended data rate, handover events, radio link failure events, and/or DRX events (e.g., sleep, wakeup, etc.).

As one specific example, once the first application and the second application have interfaced with one another and the first application has requested the second application report RAN events to the first application, the second wireless device may initiate a handover process. A period of time before the handover occurs on the second wireless device, such as 200 milliseconds, the second application may send an event report to the first application indicating the handover is started. In response to receiving the event report, the first application may override a congestion control algorithm in use and stop transmitting application data to the second application.

After the second wireless device completes the handover, the second application may send an event report to the first application indicating the handover is complete. In response to receiving the event report, the first application may increase the sending rate of application data to the second application (e.g., based on the sending rate prior to the handover) to thereby match the network capacity immediately upon handover competition.

Some embodiments may enable a first application (e.g., a communication application, such as a WebRTC application, a media streaming application, a messaging application, a videotelephone application, etc., or other type application) running on a first application processor of a first wireless device to send QoS requirements to a second application (e.g., a communication application, such as a WebRTC application, a media streaming application, a messaging application, a videotelephone application, etc., or other type application) running on a second application processor of a second wireless device. The QoS requirements sent to the second application may be QoS requirements the first application is requesting and/or requiring the second application and/or second wireless device to achieve to support application data exchanged between the first and second applications.

In some embodiments, a first application (e.g., a communication application, such as a WebRTC application, a media streaming application, a messaging application, a videotelephone application, etc., or other type application) running on a first application processor of a first wireless device may send a query, such as a RAN information request, to a second application (e.g., a communication application, such as a WebRTC application, a media streaming application, a messaging application, a videotelephone application, etc., or other type application) running on a second application processor of a second wireless device. The RAN information request may be a query asking whether the second wireless device is on a RAN and, if on a RAN, a request to provide the type of the RAN (e.g., LTE, 5G NR, WiFi, etc.).

In some embodiments, a first application (e.g., a communication application, such as a WebRTC application, a media streaming application, a messaging application, a videotelephone application, etc., or other type application) running on a first application processor of a first wireless device may send a QoS requirements message to a second application (e.g., a communication application, such as a WebRTC application, a media streaming application, a messaging application, a videotelephone application, etc., or other type application) running on a second application processor of a second wireless device in response to the second application indicting the second wireless device is on a RAN. In some embodiments, QoS requirements message may indicate QoS requirements the second application should attempt to meet. QoS requirements may include one or more of: volume of the data; maximum bit rate; average bit rate; maximum delay; average delay; maximum delay jitter; average of the absolute value of the delay jitter; maximum packet loss rate; and/or average packet loss rate. In some embodiments, QoS requirements may be determined at least in part using a model mapping a set of QoS metrics to a QoE associated with a target QoE. As an example, the QoE may be measured by a MOS.

In some embodiments, the second application (e.g., a communication application, such as a WebRTC application, a media streaming application, a messaging application, a videotelephone application, etc., or other type application) may send the QoS requirements received from the first application to a modem processor of the second wireless device. The modem processor of the second wireless device may translate the QoS requirements received from the first application (e.g., a communication application, such as a WebRTC application, a media streaming application, a messaging application, a videotelephone application, etc., or other type application) into performance metrics for the various layers of the second wireless device's wireless protocol stack (e.g., performance metrics for a SDAP layer, PDCP layer, RLC layer, MAC layer, PHY layer, etc.).

In some embodiments, the modem processor of the second wireless device may send one or more of the performance metrics to a network device or network node of the RAN, such as gNB, eNB, AP, etc., in use by the second wireless device. In some embodiments, the network device or network node of that RAN, such as gNB, eNB, AP, etc., may accept or reject one or more of any performance metrics sent by the modem processor of the second wireless device, for example based on network device or network node capabilities and/or resource availability. In some embodiments, a network device or network node of a RAN, such as gNB, eNB, AP, etc., used by the second wireless device may allocate resources based at least in part on the performance metrics.

In some embodiments, the modem processor of the second wireless device may perform logical channel prioritization based on the performance metrics. In some embodiments, the modem processor of the second wireless device may indicate to the second application (e.g., a communication application, such as a WebRTC application, a media streaming application, a messaging application, a videotelephone application, etc., or other type application) running on the second application processor of the second wireless device whether one or more of the QoS requirements may be met by the modem processor and/or the network device or network node of the RAN, such as gNB, eNB, AP, etc.

In some embodiments, the first application (e.g., a communication application, such as a WebRTC application, a media streaming application, a messaging application, a videotelephone application, etc., or other type application) running on the first application processor of the first wireless device may send an indication of its achieved QoS metrics with its own respective network device or network node of a RAN, such as gNB, eNB, AP, etc., to the second application. For example, the achieved QoS metrics may include achieved bit rate, delay, delay jitter, packet loss, etc.

The second application may determine its own resource change allocations based on the QoS metrics achieved by the first application. As an example, if the first application is experiencing a high queuing delay, the second application may prioritize the same traffic flow to reduce the queuing delay at the second application to keep the total delay (including the queueing delay at the first application, the queueing delay at the second application, and delay on the networks between the wireless devices) low enough to be acceptable. In some embodiments, the second application may indicate to the first application a confirmation that requested QoS metrics have been achieved.

FIG. 1 illustrates an example of a communications system 100 that is suitable for implementing various embodiments. The communications system 100 may be an 5G NR network, or any other suitable network such as an LTE network, WiFi network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of network devices 110a, 110b, 110c, 110d and other network entities, such as network nodes, NR base stations, etc. A network node, such as a base station is an entity that communicates with wireless devices (mobile devices or UE computing devices), and also may be referred to as an NodeB, a Node B, an LTE evolved nodeB (eNB), an Access point (AP), a radio head, a transmit receive point (TRP), a New Radio base station (NR BS), a 5G NodeB (NB), a Next Generation NodeB (gNB), or the like.

In various communication network implementations or architectures, a network node may be implemented as an aggregated base station, as a disaggregated base station, an integrated access and backhaul (IAB) node, a relay node, a sidelink node, etc. Also, in various communication network implementations or architectures, a network device (or network entity) may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

Each network node, RU or base station, may provide communication coverage for a particular geographic area. In 3GPP, the term "cell" can refer to a coverage area of a base station, an RU, a network node or a base station subsystem serving this coverage area, or a combination thereof, depending on the context in which the term is used.

A network device 110a-110d, such as a network node or base station, may provide communication coverage for a macro cell, a pico cell, a femto cell, another type of cell, or a combination thereof. A macro cell may cover a relatively large geographic area (for example, several kilometers in radius) and may allow unrestricted Access by mobile devices with service subscription. A pico cell may cover a relatively small geographic area and may allow unrestricted Access by mobile devices with service subscription. A femto cell may cover a relatively small geographic area (for example, a home) and may allow restricted Access by mobile devices having association with the femto cell (for example, mobile devices in a closed subscriber group (CSG)).

A network device, such as a network node or base station base station for a macro cell may be referred to as a macro network device. A network device for a pico cell may be referred to as a pico network device. A network device for a femto cell may be referred to as a femto network device or a home network device. In the example illustrated in FIG. 1, a network device 110a may be a macro network device for a macro cell 102a, a network device 110b may be a pico network device for a pico cell 102b, and a network device 110c may be a femto network device for a femto cell 102c. A network device 110a-110d may support one or multiple (for example, three) cells. The terms "network node," "RU," "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile network device. In some examples, the network device 110a-110d may be interconnected to one another as well as to one or more other network device or network nodes (not illustrated) in the communications system 100 through various types of backhaul interfaces, such as a direct physical connection, a virtual network, or a combination thereof using any suitable transport network.

The network device 110a-110d may communicate with the core network 140 over a wired or wireless communication link 126. The wireless device 120a-120e (UE computing device) may communicate with the network device 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay network device 110d). A relay station is an entity that can receive a transmission of data from an upstream station (for example, a base station or a mobile device) and send a transmission of the data to a downstream station (for example, a wireless device or a network device). A relay station also may be a mobile device that can relay transmissions for other wireless devices. In the example illustrated in FIG. 1, a relay station 110d may communicate with macro the network device 110a and the wireless device 120d in order to facilitate communication between the network device 110a and the wireless device 120d. A relay station also may be referred to as a relay network device, a relay RU, a relay network node, a relay base station, etc.

The communications system 100 may be a heterogeneous network that includes network devices of different types, for example, macro network devices, pico network devices, femto network devices, relay network devices, etc. These different types of network devices and network nodes (e.g., RU, base station, etc.) may have different transmit power levels, different coverage areas, and different impacts on interference in communications system 100. For example, macro network devices may have a high transmit power level (for example, 5 to 40 Watts) whereas pico network devices, femto network devices, and relay network devices may have lower transmit power levels (for example, 0.1 to 2 Watts).

A network controller 130 may couple to a set of network devices and may provide coordination and control for these network devices. The network controller 130 may communicate with the network devices via a backhaul. The network devices also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an Access terminal, a UE, a terminal, a mobile station, a subscriber unit, a station, etc.

A macro network device 110a may communicate with the communication network 140 over a wired or wireless communication link 126. The wireless devices 120a, 120b, 120c may communicate with a network device 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio Access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL Control data.

Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a network device, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio Access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the wireless device 120a and the wireless device 120e) may communicate directly using one or more sidelink channels 124 (for example, without using a network device 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the network device 110a-110d.

Figure 2:
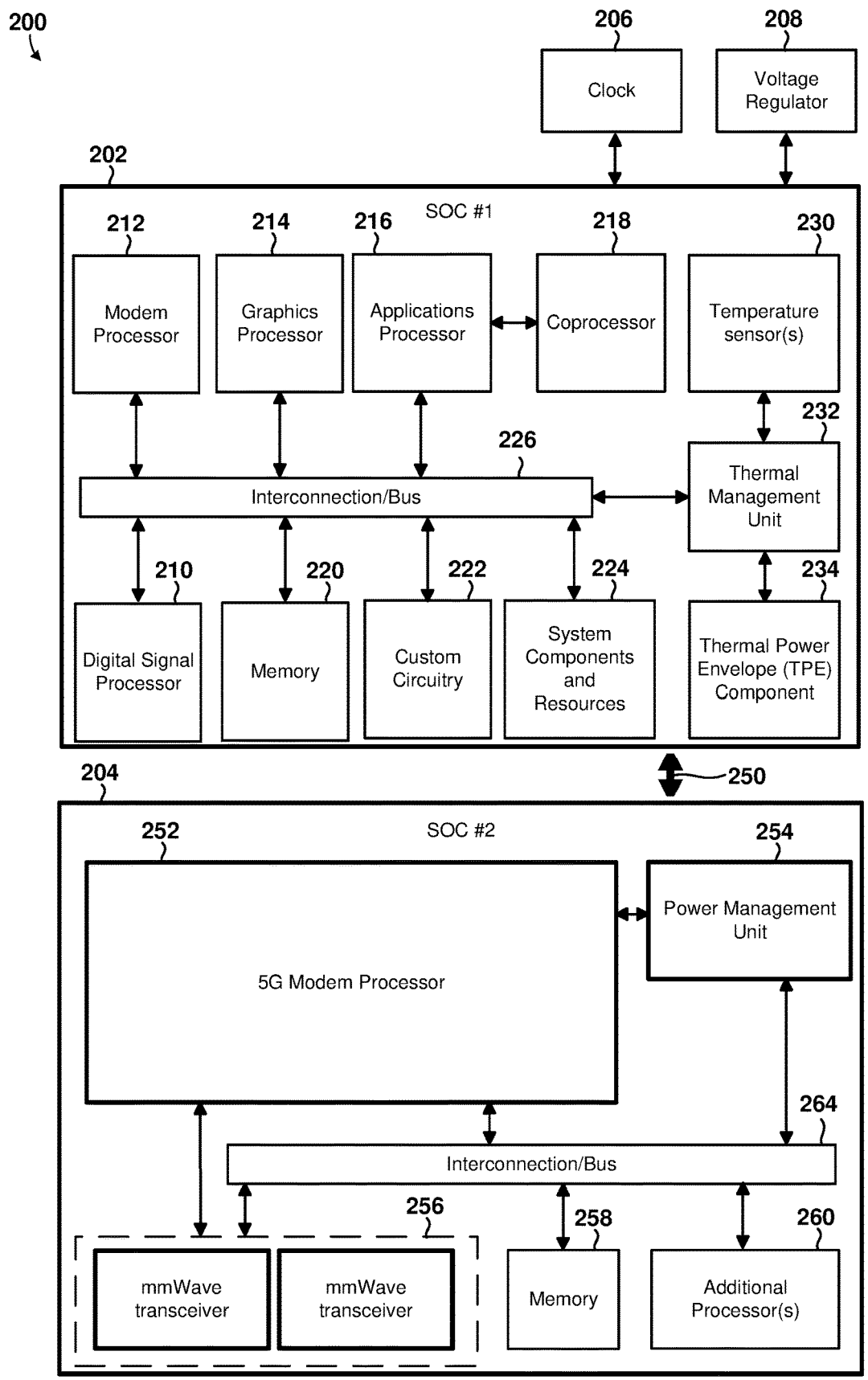
FIG. 2 is a component block diagram illustrating an example computing and wireless modem system suitable for implementing any of the various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices (UE computing devices) implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the wireless device that carries out the instructions of software application programs by performing the arithmetic, logical, Control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuity 222, system components and resources 224, an interconnection/bus module 226, one or more temperature sensors 230, a thermal Management unit 232, and a thermal power envelope (TPE) component 234. The second SOC 204 may include a 5G modem processor 252, a power Management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, Access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal Management unit 232 via an interconnection/bus module 226. Similarly, the processor 252 may be interconnected to the power Management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
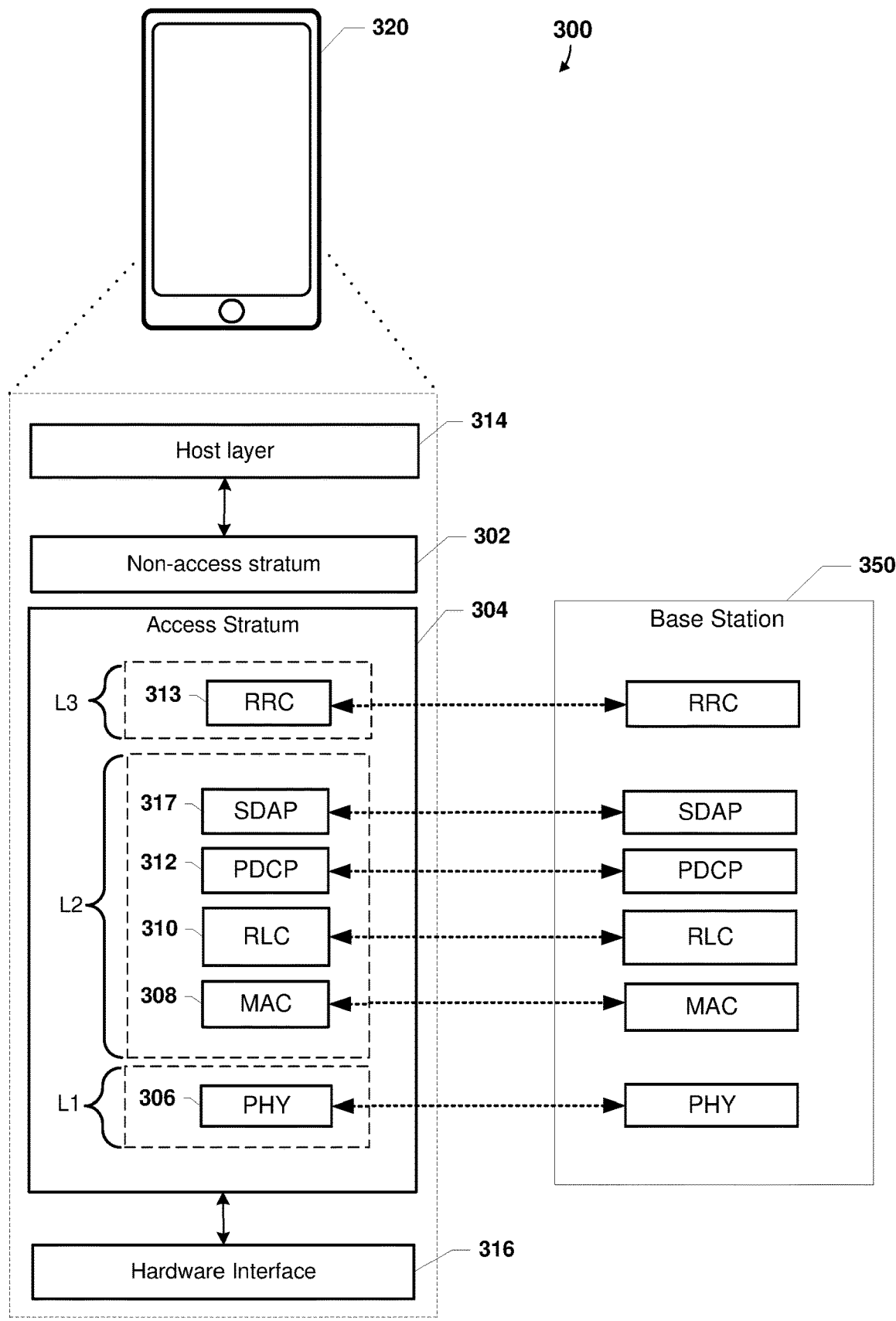
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack, also referred to as a wireless protocol stack, for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the network device 350 (e.g., the network device 110a-d) of a communication system (e.g., 100). In some embodiments, layers in software architecture 300 may form logical connections with corresponding layers in software of the network device 350. The software architecture 300 may be distributed among one or more processors (e.g., the processors 212, 214, 216, 218, 252, 260).

While illustrated with respect to one radio protocol stack (or one wireless protocol stack), in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and network devices of supported access networks (e.g., a network nodes, an RU, a base station, etc.). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support Channel State Information (CSI) measurements and reporting (e.g., Channel Quality Indicator (CQI) measurements and reporting).

In the user and control planes, Layer 2 (L2) of the AS 304 may be responsible for the link between the wireless device 320 and the network device 350 over the physical layer 306. In the various embodiments, Layer 2 may include a Media Access Control (MAC) sublayer 308, a Radio Link Control (RLC) sublayer 310, a Packet Data Convergence Protocol (PDCP) 312 sublayer, and a Service Data Adaptation Protocol (SDAP) 317 sublayer, each of which form logical connections terminating at the network device 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the network device 350.

In various embodiments, the SDAP sublayer 317 may provide mapping between Quality of Service (QoS) flows and data radio bearers (DRBs). In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

In various network implementations or architectures, the different logical layers 308-317 may be implemented in an aggregated or monolithic base station architecture, or alternatively, in a disaggregated network device architecture, and various logical layers may implemented in one or more of a CU, a DU, an RU, a Near-RT RAN Intelligent Controller (RIC), or a Non-Real Time (Non-RT) RIC. Further, the network device 350 may be implemented as an aggregated base station, as a disaggregated base station, an integrated access and backhaul (IAB) node, a relay node, a sidelink node, etc.

Figure 4:
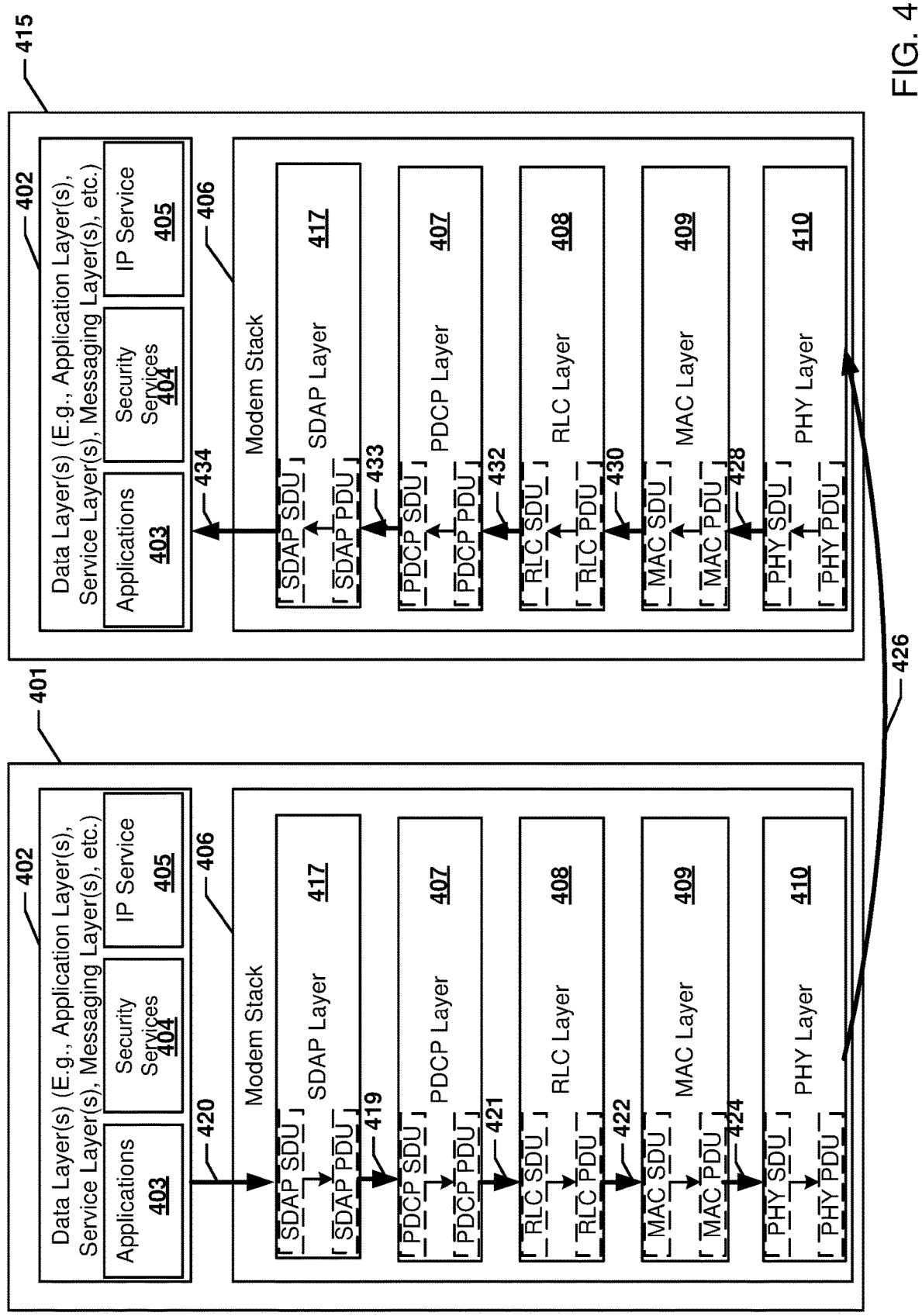
FIG. 4 is a block diagram illustrating an example of interactions between stack architecture layers in a transmitting communication device and a receiving communication device in accordance with various embodiments.

FIG. 4 illustrates interactions between stack architecture layers in a transmitting communication device 401 and a receiving communication device 415 in accordance with various embodiments. With reference to FIGS. 1-4, the communication devices 401, 415 may each be any type of communication device (e.g., wireless device 120*a*-120*e*, 200, 320, network device 110*a*-*d*, 350) implementing various embodiments. As a specific example, the communication device 401 may be a network device of a 5G NR RAN (e.g., a gNB) and the communication device 415 may a wireless device (also referred to as a UE).

Each communication device 401, 415 may include one or more higher data layers 402 configured to exchange data with a modem stack (or radio protocol stack or wireless protocol stack) 406. As examples, the higher data layers 402 may be one or more application layers, one or more service layers, one or more messaging layers, application layers, etc. As examples, the functionality performed in the higher data layers 402 may include applications 403 (e.g., multicast applications, messaging applications, etc.), security services 404, Internet Protocol (IP) services 405 (e.g., Transmission Control Protocol (TCP) services, Uniform Datagram Protocol (UDP) services, etc.), other higher data layer functionality, or any combination thereof. In some embodiments, the higher data layers 402 and the modem stack 406 on the communication device 401, 415 may be running on the same processor of the communication device 401, 415. In some embodiments, the higher data layers 402 and the modem stack 406 on the communication device 401, 415 may run on different processors of the communication device 401, 415. As an example, the higher data layers 402 may run on an application processor (e.g., application processor 216) and the modem stack 406 may run on a modem processor (e.g., modem processor 212, modem processor 252). While illustrated in FIG. 4 as being on the same communication device 401, 415, in some embodiments, the higher data layers 402 may run on a processor of a separate communication device.

In some embodiments, the modem stack 406 may include a Service Data Adaptation Protocol (SDAP) layer 417, a packet data convergence protocol (PDCP) layer 407, a radio link control (RLC) layer 408, a media access control (MAC) layer 409, and a physical (PHY) layer 410. The PHY 410 may be the lowest layer of the modem stack 406 and the PDCP layer 407 may be the highest layer of the modem stack 406.

The SDAP layer 417 may handle SDAP packets and may provide mapping between Quality of Service (QoS) flows and data radio bearers (DRBs). SDAP entities of the SDAP layer 417 may receive SDAP. The SDAP layer 417 may receive packets from the higher data layers 402 and may output packets to the PDCP layer 407. The SDAP layer 417 may receive packets from the PDCP layer 407 and may output packets to the higher layers 402.

The PDCP layer 407 may handle PDCP packets and may provide maintenance of PDCP SNs, header compression, ciphering, and/or integrity protection for the PDCP packets, duplicate detection and discarding, re-ordering, in order delivery, out of order delivery etc. The PDCP layer 407 may receive packets from the higher data layers 402 and/or SDAP layer 417, and may output packets to the RLC layer 408. The PDCP layer 407 may receive packets from the RLC layer 408 and may output packets to the higher layer 402 and/or SDAP layer 417.

The RLC layer 408 may handle RLC packets and may provide error correction, segmentation, reassembly, reordering, duplication detection, error detection, and/or error recovery for the RLC packets. Additionally, the RLC layer 408 may buffer RLC packets in a reception buffer, such as to support reordering, await missing RLC packets, etc. The RLC layer 408 may operate in different modes, such as an acknowledge mode (AM), unacknowledged mode (UM), and transparent mode (TM). The RLC layer 408 may receive packets from the PDCP layer 407 and may output packets to the PDCP layer 407. The RLC layer 408 may receive packets from the MAC layer 409 and may output packets to the MAC layer 409.

The MAC layer 409 may handle various functions including mapping between logical channels and transport channels, multiplexing and demultiplexing of MAC SDUs belonging to one or different logical channels into/from transport blocks (TB) delivered to/from the physical layer on transport channels, scheduling information reporting, error correction through HARQ, priority handling between wireless devices by use of dynamic scheduling, priority handling between logical channels of one wireless device by logical channel prioritization etc. The MAC layer 409 may receive packets from the RLC layer 408 and may output packets to the RLC layer 408. The MAC layer 409 may receive packets from the PHY layer 410 and may output packets to the PHY layer 410.

The PHY layer 410 may handle PHY packets and may provide the communication interface between the hardware supporting the physical transmission medium (e.g., transceivers, antennas, etc.) and the higher layers of the modem stack 406. The PHY layer 410 may convert PHY packets into a bitstream for transmission and/or convert a received bitstream into PHY packets. The PHY layer 410 provide encoding, transmission, reception, and/or decoding for the PHY packets. The PHY layer 410 may receive packets from the MAC layer 409 and may output packets to the MAC layer 409.

The packets transferred to/from a higher data layer of the modem stack 406 may be referred to as a service data units (SDU) in a given layer and packets transferred to/from a lower layer of the modem stack 406 may be referred to as protocol data units (PDUs). For example, the packets received into the RLC layer 408 from the PDCP layer 407, as well as the packets transferred from the RLC layer 408 to the PDCP layer 407, may be referred to as RLC SDUs. Similarly, the packets received into the RLC layer 408 from the MAC layer 409, as well as the packets transferred from the RLC layer 408 to the MAC layer 409, may be referred to as RLC PDUs.

A layer's SDUs may be the next higher layer's PDUs, just as the layer's PDUs may be the next lower layer's SDUs. For example, a SDAP PDU sent to the PDCP layer 407 from the SDAP layer 417 may be referred to as a PDCP SDU upon receipt by the PDCP layer 407. As another example, a PDCP PDU sent to the RLC layer 408 from the PDCP layer 407 may be referred to as an RLC SDU upon receipt by the RLC layer 408. Similarly, a MAC SDU sent from the MAC layer 409 to the RLC layer 408 may be referred to as an RLC PDU upon receipt by the RLC layer 408.

Layers within the protocol stack may convert PDUs to SDUs and SDUs to PDUs by performing on the packets various operations assigned to that layer. For example, an RLC SDU may be segmented by the RLC layer 408 to cover the RLC SDU into one or more RLC PDUs. Similarly, a plurality of received RLC PDUs may be reordered and reassembled to covert the plurality of received RLC PDUs to an RLC SDU. Additionally, a layer may add data to a packet to covert an SDU to a PDU or a layer may remove data from a packet to convert a PDU to an SDU. For example, an RLC layer 408 may add a packet header/footer to an RLC SDU to convert the RLC SDU to an RLC PDU. Similarly, an RLC layer 408 may remove a packet header/footer from an RLC PDU to covert the RLC PDU to an RLC SDU.

Referring to FIG. 4, the following is an example of packet handling when one communication device 401 transmits a communication that is received by another communication device 415.

An application of the higher data layer 402 of the transmitting communication device 401 may generate a packet of a message 420 for transmission to an application 403 of the receiving communication device. The packet of the message 420 may be sent from the higher data later 401 to the SDAP layer 417 that may send the message as a PDCP SDU 419 to the PDCP layer 407 of the modem stack 406 on the transmitting communication device 401.

The PDCP layer 407 may receive the packet of the message as a PDCP SDU 419 and convert the PDCP SDU to a PDCP PDU 421. The PDCP layer 407 may transfer the PDCP PDU 421 to the lower RLC layer 408.

The RLC layer 408 may receive the PDCP PDU 421 as an RLC SDU, and may convert the RLC SDU (i.e., the PDCP PDU 421) to one or more RLC PDUs 422 by, for example, adding an RLC packet header/footer and/or applying segmentation. As an example, segmentation to split the RLC SDU into multiple RLC PDUs 422 may be needed when the RLC SDU (i.e., the PDCP PDU 421) is larger than a maximum RLC PDU size. When segmentation is applied to convert the RLC SDU into multiple RLC PDUs 422, each created RLC PDU 422 may be associated with a single RLC SDU (i.e., a single PDCP PDU 421). Additionally, the RLC layer 408 may add sequence numbers to the one or more RLC PDUs 422. The sequence numbers may indicate an ordering of the one or more RLC PDUs 422. The RLC layer 408 may transfer 424 the one or more RLC PDUs 422 to the lower MAC layer 409, which may transfer one or more MAC SDUs 424 to the physical layer 410. The physical (PHY) layer may transmit the SDUs 426 to the physical layer 410 on receiving UE 415. A similar process occurs in the protocol stack 406 on the receiving UE in SDU exchanges 428, 430, 432, 433, 434 among the physical layer 410, MAC layer 409, RLC layer 408, PDCP layer 407 and SDAP layer 417.

Figure 5A:
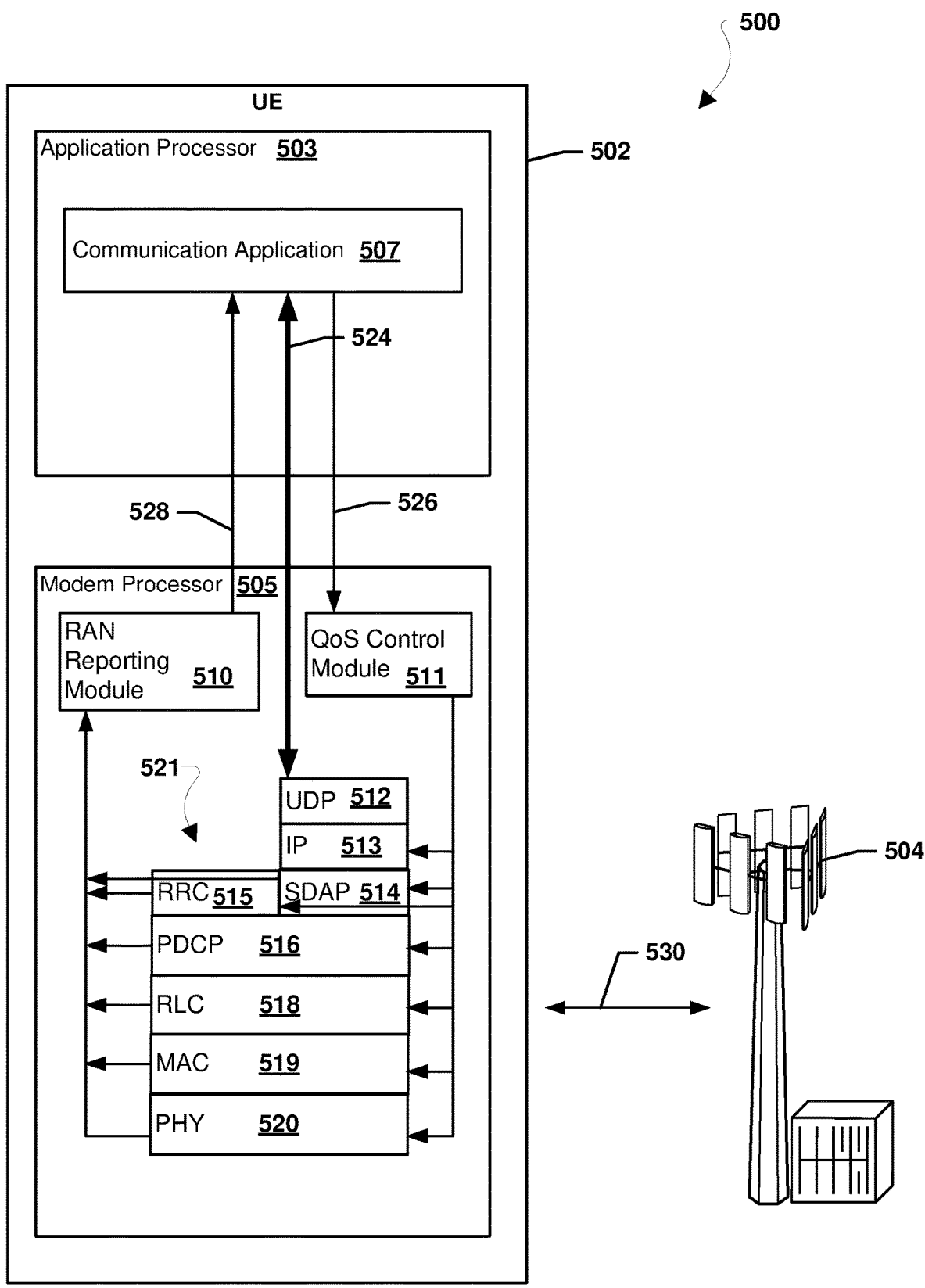
FIG. 5A is a block diagram illustrating an example of interactions between a wireless computing device and a network device in accordance with some embodiments.

FIG. 5A is illustrates example of interactions in a communication link 500 between a wireless device 502 and a network device 504 in accordance with various embodiments. With reference to FIGS. 1-5A, the wireless device 502 may be any type wireless device (e.g., the wireless device 120a-120e, 200, 320, 401, 415) and the network device may be any type network device 110a-110d, 350, 401, 415. The modem processor 505 of the wireless device 502 may control one or more RF resources of the wireless device 502 to establish one or more communication connections 530 (e.g., UL connections, DL connections, overhead signaling connections, etc.) with the network device 504.

The wireless device 502 may include an application processor 503 (e.g., application processor 216) and a modem processor 505 (e.g., modem processor 212, modem processor 252). A communication application 507 (e.g., a WebRTC application, a media streaming application, messaging application, videotelephone application, etc.) may run on the application processor 503. The communication application 507 is an example of an application 403 that may run on the application processor 503 and other types of applications may be substituted for the communication application 507 in various embodiments. The communication application 507 may be part of a higher data layer (e.g., higher data layer 402) sending and/or receiving data 524 (e.g., packets for transmission 420, received packets 434, etc.) to a wireless protocol stack 521 (e.g., modem stack 406) running on the modem processor 505.

The wireless protocol stack 521 of the modem processor 505 may include various modules and layers, such as a RAN reporting module 510, QoS control module 511, UDP layer 512, IP layer 513, RRC layer 515 (e.g., RRC layer 313), SDAP layer 514 (e.g., SDAP layer 317, 417), PDCP layer 516 (e.g., PDCP layer 312, 407), RLC layer 518 (e.g., RLC layer 310, 408), MAC layer 519 (e.g., MAC layer 308, 409), PHY layer 520 (e.g., PHY layer 306, 410), etc. While illustrated as separate modules and/or layers, the various illustrated modules and/or layers may be combined together into one or more common modules and/or layers. For example, while illustrated as separate modules, the RAN reporting module 510 and QoS control module 511 may be combined into a single module performing both the operations of the RAN reporting module 510 and QoS control module 511. In various embodiments, the RAN reporting module 510 may and/or the QoS control module 511 may interface with the various layers of the wireless protocol stack 512, such as layers 512-520. In various embodiments, the RAN reporting module 510 may and/or the QoS control module 511 may interface with the communication application 507. For example, the RAN reporting module 510 may and/or the QoS control module 511 may interface with the communication application via an API or other communication pathway.

In various embodiments, the QoS control module 511 may receive QoS requirements messages 526 from the communication application 507. For example, a communication application 507 may send indications of QoS requirements messages 526 for the communication application 507 to the QoS control module 511. As examples, QoS requirements messages 526 may include one or more various QoS requirements indications. QoS requirements indications may include as traffic prioritization requirements desired delay indications, desired delay jitter indications, etc. As specific examples, QoS requirements messages 526 may include traffic prioritization requirements, desired delay indications, and/or desired delay jitter indications. In various embodiments, QoS requirements may be determined at least in part using a model mapping a set of QoS metrics to a Quality of Experience (QoE) associated with a target QoE. As an example, the QoE may be measured by a mean opinion score (MOS). In various embodiments, the QoS control module 511 may translate the QoS requirements messages 526 received from the communication application 507 into performance metrics for the various layers 512-520 of the wireless protocol stack 521. In various embodiments, the QoS control module 511 may perform logical channel prioritization based on the performance metrics.

In various embodiments, the QoS control module 511 may send performance metrics generated from the QoS requirements messages 526 to the network device 504 via the one or more communication connections 530. In various embodiments, the network device 504 may accept or reject one or more of any performance metrics sent by the QoS control module 511, for example based on network device 504 capabilities and/or resource availability. In various embodiments, the network device 504 may allocate resources based at least in part on the performance metrics.

In various embodiments, the QoS control module 511 and/or the RAN reporting module 510 may indicate to the application 507 whether one or more of the QoS requirements messages 526 may be met by the modem processor 505 and/or the network device 504. In various embodiments, the QoS control module 511 and/or the RAN reporting module 510 may indicate to the application 507 the achieved QoS metrics of the modem processor 505 and/or the network device 504, such as achieved bit rate, delay, delay jitter, packet loss, etc.

In various embodiments, the RAN reporting module 510 may send information about RAN statistics and/or events messages 528 to the application 507. In some embodiments, information about RAN statistics and/or events messages 528 may be sent to the application 507 periodically. For example, the application 507 may register for one or more types of RAN statistics and/or events messages 528 and may indicate a periodicity of often those RAN statistics and/or events messages 528 are to be reported. The RAN reporting module 510 may send information about the registered RAN statistics and/or events messages 528 at the indicated periodicity. In some embodiments, information about RAN statistics and/or events messages 528 may be sent to the application 507 on-demand. For example, the application 507 may send a query for one or more types of RAN statistics and/or events messages 528 and the RAN reporting module 510 may respond with information about the queried RAN statistics and/or events messages 528 in response to the query.

In various embodiments, RAN statistics may be attributes associated with the wireless connection(s) 530 between the modem processor 505 and the network device 504. As an example, a RAN statistic may be a packet loss rate. As an example, a RAN statistic may be a packet delay. As an example, RAN statistic may be a packet delay jitter and/or variation. As an example, a RAN statistic may be a data rate. As a specific example, the data rate may be the measured data rate for the UL and/or the DL connection with the network device 504. The data rate may be a raw data rate and/or smooth data rate (e.g., a data rate computed with a smoothing factor). The data rate may include the time interval over which the data rate was computed. As an example, a RAN statistic may be an available data rate. The available data rate may be for the UL or DL. The available data rate may be based on the observed past data rate and the resource allocation for a future period. The available data rate may be computed locally by the RAN reporting module 510. The available data rate may be computed by the network device 504, and signaled to the modem processor 505. The available data rate may include an indication of a time period for which the available data rate may be assumed valid (e.g., a TTL value, etc.) As an example, a RAN statistic may be a recommended bit rate. In various embodiments, the RAN statistics may be associated with one or more different PDUs (or transport blocks) of the wireless protocol stack 521. For example, RAN statistics may be associated with one or more of SDAP PDUs, PDCP PDUs, RLC PDUs, MAC PDUs, etc. As specific examples, RAN statistics may be associated with SDAP PDUs, PDCP PDUs, RLC PDUs, and/or MAC PDUs for 5G NR RANs, PDCP PDUs, RLC PDUs, and/or MAC PDUs for LTE RANs, and MAC PDUs for WiFi RANs.

In various embodiments, RAN events may be events associated with the wireless connection(s) 530 between the modem processor 505 and the network device 504. In various embodiments, indications of RAN events may be sent from the RAN reporting module 510 to the application 505. As an example, a RAN event may be a handover event. As specific examples, an indication of a RAN event may be an indication that a handover has started, a handover has completed, etc. As an example, a RAN event may be a radio link failure. As specific examples, an indication of a RAN event may be an indication that a radio link failed, that a radio link was established, etc. As an example, a RAN event may be a DRX. As specific examples, an indication of a RAN event may be an indication of a DRX time to sleep, a DRX time to wake up, etc. As an example, a RAN event may be a service interruption. As specific examples, an indication of a RAN event may be an indication of a start time of a service interruption, an expected time to restore service, etc. As an example, a RAN event may be a loss or delay of an application layer packet of a particular type. In various embodiments, the RAN reporting module 510 may store an indication of a mapping of application layer packets (e.g., RTP packets) to the PDUs of the various layers 512-520, that the application layer packets are associated with as the application layer packets are prepared for transmission by the wireless device 502. The RAN reporting module 510 may compare an indication of a lost and/or delayed PDU to the stored mapping of the application layer packets to determine the application layer packet mapped to the lost and/or delayed PDU. In various embodiments, the RAN reporting module 510 may report the loss of an application layer packet based on the loss of a PDU to which the application layer packet may be mapped. In various embodiments, the RAN reporting module 510 may report the delay of an application layer packet based on the delay of a PDU to which the application layer packet may be mapped.

In various embodiments, a modem processor 505 may receive a message, such as a report, MAC CE, other type message, etc., from the network device 504. The received message may include indications associated with one or more RAN statistics and/or events. In various embodiments, the RAN reporting module 510 may process the received message, such as a report, MAC CE, other type message, etc., and/or the RAN reporting module 510 may locally observe one or more RAN statistics and/or events. In various embodiments, the RAN reporting module 510 may generate one or more report indicating information from the received message and/or locally observed RAN statistics and/or events and may send the one or more reports to the application 507 as RAN statistics and/or events messages 528.

Figure 5B:
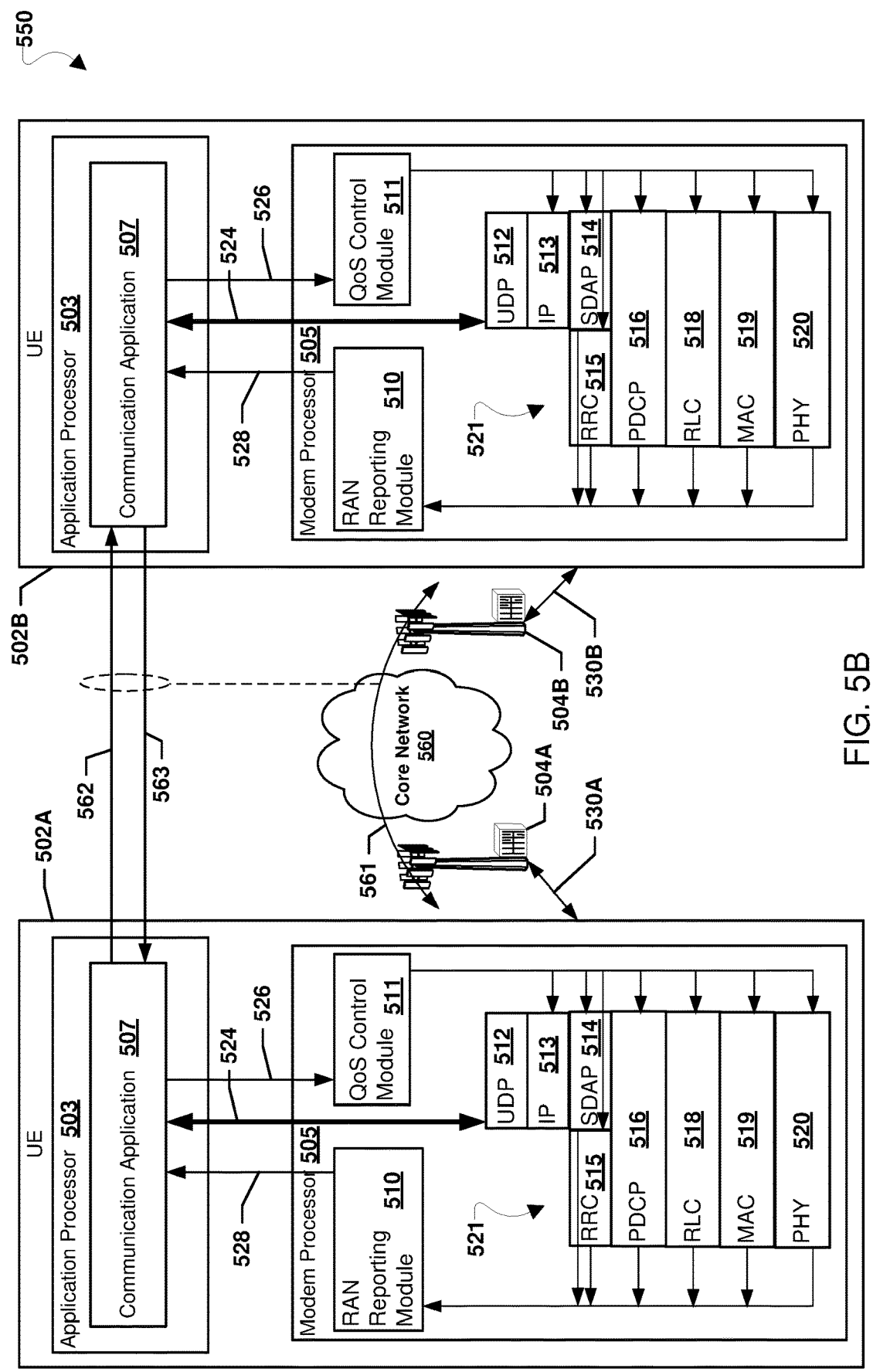
FIG. 5B is a block diagram illustrating an example of interactions between a first wireless computing device and a remote wireless computing device in accordance with some embodiments.

FIG. 5B is a block diagram 550 illustrating an example of interactions between a first wireless device 502A and a second wireless device 502B in accordance with various embodiments. With reference to FIGS. 1-5B, the first wireless device 502A and the second wireless device 502B may both be examples of wireless device 502 discussed with reference to FIG. 5A. Each of the first wireless device 502A and the second wireless device 502B may establish its own wireless connections 530A and 530B with its own respective network devices 504A and 504B. The wireless connections 530A and 530B and the network devices 504A and 504B may both be examples of wireless connections 530 and network device 504 discussed with reference to FIG. 5A. The network devices 504A and 504B may be portions of respective RANs connected to one or more core networks 560 (e.g., core network 140) that may support communication connections between the network devices 504A and 504B via their respective RANs, core networks 560, and any intervening networks, such as the Internet. In this manner, the network devices 504A and 504B may enable the wireless devices 502A and 502B to establish communication pathways with one another. Via these communication pathways, the wireless devices 502A and 502B may exchange one or more messages 561 with one another via a core network 560.

In various embodiments, the one or more messages 561 exchanged between the wireless devices 502A and 502B may include messages 562, such as QoS requirements and/or RAN statistics and/or events, sent from the communication application 507 of the first wireless device 502A to the communication application 507 of the second wireless device 502B. The QoS requirements sent to the communication application 507 of the second wireless device 502B may be QoS requirements the communication application 507 of the first wireless device 502A is requesting and/or requiring the communication application 507 of the second wireless device 502B and/or the second wireless device 502B to achieve to support application data exchanged between the applications 507. The RAN statistics and/or events from the communication application 507 of the first wireless device 502A may be RAN statistics and/or events associated with the wireless connections 530A between the first wireless device 502A and the network device 504A.

In various embodiments, the one or more messages 561 exchanged between the wireless devices 502A and 502B may include messages 563, such as QoS requirements and/or RAN statistics and/or events, sent from the communication application 507 of the second wireless device 502B to the communication application 507 of the first wireless device 502A. The QoS requirements sent to the communication application 507 of the first wireless device 502A may be QoS requirements the communication application 507 of the second wireless device 502B is requesting and/or requiring the communication application 507 of the first wireless device 502A and/or the first wireless device 502A to achieve to support application data exchanged between the applications 507. The RAN statistics and/or events from the communication application 507 of the second wireless device 502B may be RAN statistics and/or events associated with the wireless connections 530B between the second wireless device 502B and the network device 504B.

As an example of the messages 562, the communication application 507 of the first wireless device 502A may send a request, such as a RAN information request, to the communication application 507 of the second wireless device 502B. The RAN information request may be a query asking whether the second wireless device 502B is on a RAN and, if on a RAN, a request to provide the type of the RAN (e.g., LTE, 5G NR, WiFi, etc.), and a request for statistics and/or reporting of events for that RAN of the second wireless device 502B. In various embodiments, the communication application 507 of the second wireless device 502B may report the RAN statistics and/or events back to the communication application 507 of the first wireless device 502A via messages 563 periodically and/or on-demand in response to a query. Example RAN statistics and/or events that may be reported by the communication application 507 of the second wireless device 502B to the communication application 507 of the first wireless device 502A may include packet loss rate, packet delay, packet delay jitter and/or variation, data rate, available data rate, recommended data rate, handover events, radio link failure events, and/or DRX events (e.g., sleep, wakeup, etc.).

As another example of the messages 562, a communication application 507 of the first wireless device 502A may send a QoS requirements message to a communication application 507 of the second wireless device 502B in response to the communication application 507 of the second wireless device 502B indicting the second wireless device 502B is on a RAN. In various embodiments, QoS requirements message may indicate QoS requirements the communication application 507 of the second wireless device 502B should attempt to meet. QoS requirements may include one or more of: volume of the data; maximum bit rate; average bit rate; maximum delay; average delay; maximum delay jitter; average of the absolute value of the delay jitter; maximum packet loss rate; and/or average packet loss rate. In various embodiments, QoS requirements may be determined at least in part using a model mapping a set of QoS metrics to a QoE associated with a target QoE. As an example, the QoE may be measured by a MOS.

The communication application 507 of the second wireless device 502B may send the QoS requirements received from the communication application 507 of the first wireless device 502A in messages 562 to the modem processor 505 of the second wireless device 502B. The QoS control module 511 of the second wireless device 505 may translate the QoS requirements received from the communication application 507 of the first wireless device 502A into performance metrics for the various layers in the wireless protocol stack 521 of the second wireless device 502B, such as layers 512-520. In various embodiments, the QoS control module 511 of the second wireless device 502B may send one or more of the performance metrics to the network device 504B. The network device 504B may accept or reject one or more of any performance metrics sent by the QoS control module 511 of the second wireless device 502B, for example based on network device 504B capabilities and/or resource availability. The network device 504B may allocate resources based at least in part on the performance metrics. The modem processor 505 of the second wireless device 507 may perform logical channel prioritization based on the performance metrics. The RAN reporting module 510 of the second wireless device 502B may indicate to the communication application 507 of the second wireless device 502B whether one or more of the QoS requirements may be met by the modem processor 505 of the second wireless device 502B and/or the network device 504B. The communication application 507 of the second wireless device 502B may send an indication of whether one or more of the QoS requirements may be met by the modem processor 505 of the second wireless device 502B and/or the network device 504B to the communication application 507 of the first wireless device 502A as a message 563.

As another example of the messages 562, the communication application 507 of the first wireless computing device 502A may send an indication of its achieved QoS metrics with its own respective network device 504A to the communication application 507 of the second wireless device 502B. For example, the achieved QoS metrics may include achieved bit rate, delay, delay jitter, packet loss, etc. The communication application 507 of the second wireless device 502B may determine its own resource change allocations based on the QoS metrics achieved by the communication application 507 of the first wireless device 502A. As an example, if the communication application 507 of the first wireless device 502A is experiencing a high queuing delay, the communication application 507 of the second wireless device 502B may prioritize the same traffic flow to reduce the queuing delay at the communication application 507 of the second wireless device 502B to keep the total delay low enough to be acceptable. As an example of the messages 563, the communication application 507 of the second wireless device 502B may indicate to the communication application 507 of the first wireless device 502A a confirmation that requested QoS metrics have been achieved.

Figure 6:
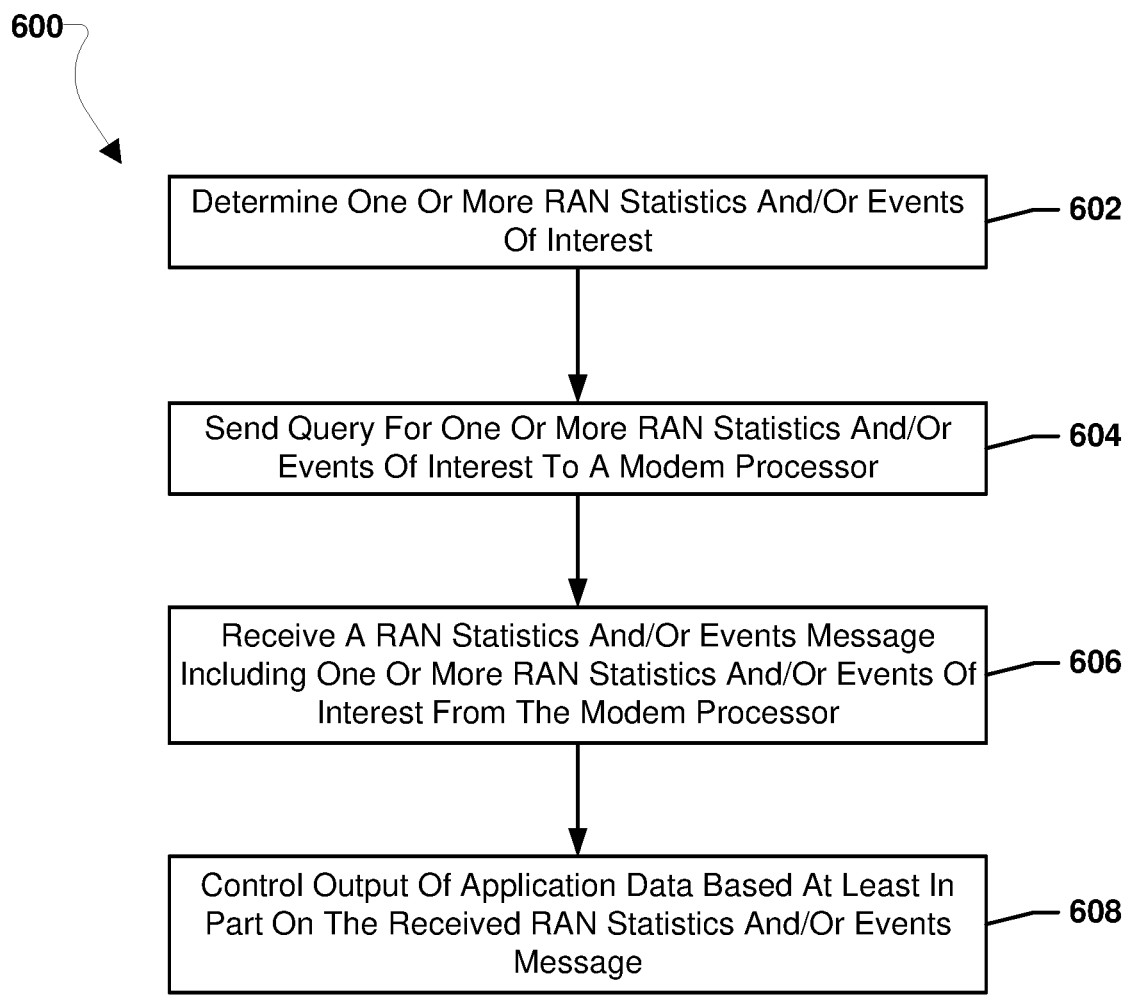
FIG. 6 is a process flow diagram illustrating a method performed by an application processor of a wireless device for supporting application level discovery of Radio Access Network (RAN) statistics and/or events in accordance with some embodiments.

FIG. 6 shows a process flow diagram illustrating an example method 600 for supporting application level discovery of RAN statistics and/or events in accordance with various embodiments. With reference to FIGS. 1-6, the method 600 may be implemented by an application processor (e.g., application processor 216, 503, etc.) and a modem processor (e.g., 212, 252) of a wireless device (e.g., wireless device 120a-120e, 200, 320, 401, 415, 502, 502A, 502B, etc.).

In block 602, the application processor may perform operations to determine one or more RAN statistics and/or events of interest. As examples, RAN statistics and/or events of interest may include a delay indication, a delay jitter indication, a packet loss rate, a handover event, a data rate, an available data rate, a recommended bit rate, a radio link failure, a discontinuous reception event, a service interruption, a loss or delay of an application layer packet of a particular type, etc.

In block 604, the application processor may perform operations to send a query for one or more RAN statistics and/or events of interest to a modem processor (e.g., modem processor 212, 252, 272, 505, etc.) of a wireless device (e.g., wireless device 120a-120e, 200, 320, 401, 415, 502, 502A, 502B, etc.).

In block 606, the application processor may perform operations to receive a RAN statistics and/or events message including one or more RAN statistics and/or events of interest from the modem processor.

In block 608, the application processor may perform operations to control the output of application data based at least in part on the received RAN statistics and/or events message. As a specific example, the RAN statistics and/or events of interest indicated in the RAN statistics and/or events message may be an indication that a handover event is occurring. The application processor may perform operations such that an application running on the application processor (e.g., communication application 507, etc.) may stop sending data packets to the modem processor during the handover. As another specific example, the RAN statistics and/or events of interest indicated in the RAN statistics and/or events message may be an indication that a handover event has completed and/or that data transmission rate can be increased. The application processor may perform operations such that an application running on the application processor (e.g., communication application 507, etc.) may increase the data transmission rate to the modem processor in response to receiving the indication that a handover event has completed and/or that data transmission rate can be increased.

Figure 7:
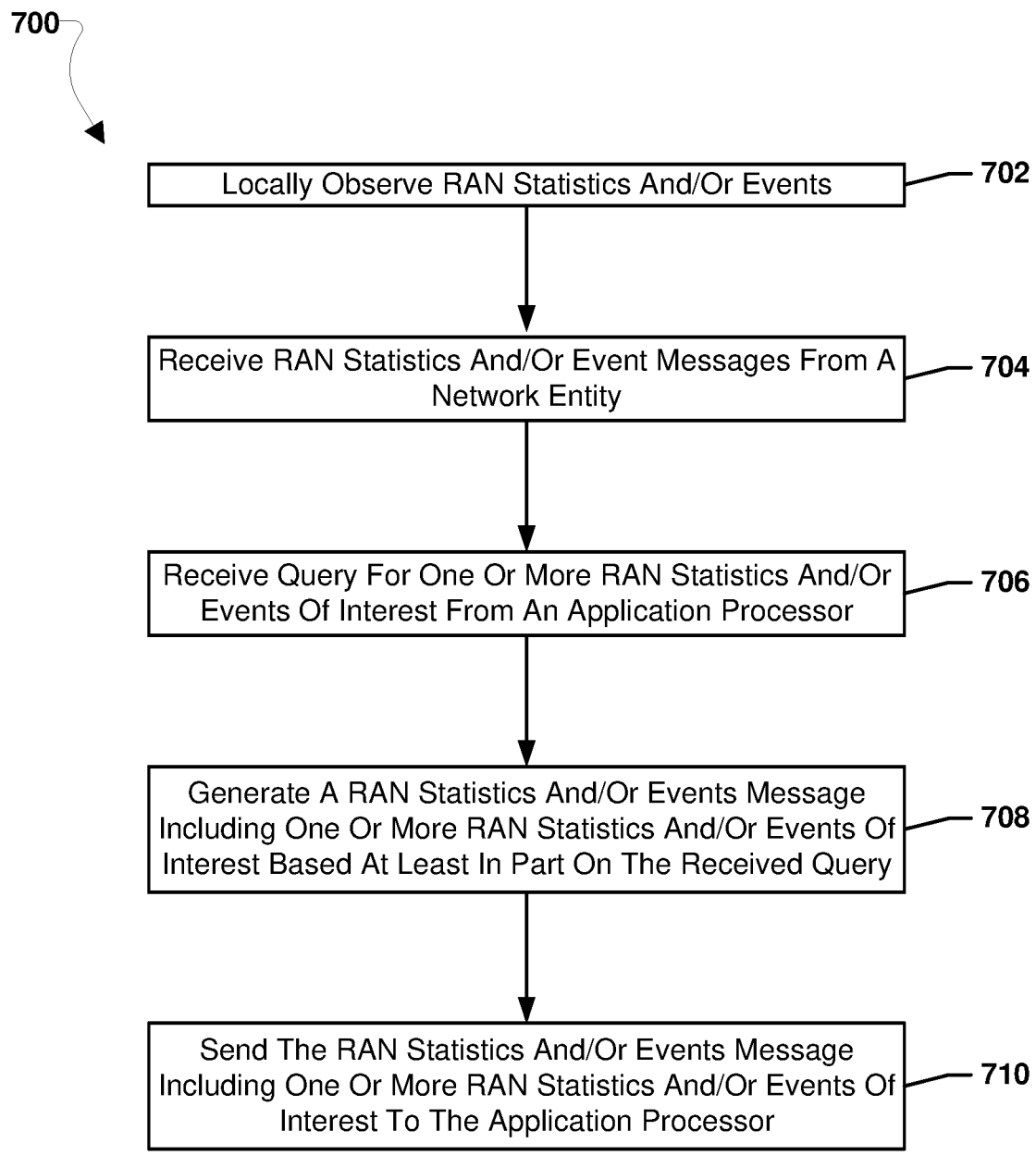
FIG. 7 is a process flow diagram illustrating a method performed by a modem processor of a wireless device for supporting application level discovery of RAN statistics and/or events in accordance with some embodiments.

FIG. 7 shows a process flow diagram illustrating an example method 700 for supporting application level discovery of RAN statistics and/or events in accordance with various embodiments. With reference to FIGS. 1-7, the method 700 may be implemented by a modem processor (e.g., modem processor 212, 252, 272, 505, etc.) of a wireless device (e.g., wireless device 120a-120e, 200, 320, 401, 415, 502, 502A, 502B, etc.). In various embodiments, the operations of method 700 may be performed in conjunction with the operations of method 600 (FIG. 6).

In block 702, the modem processor may perform operations to locally observe RAN statistics and/or events. In various embodiments, RAN statistics and/or events that may be locally observed may be any RAN statistics and/or events that may be observable by a wireless protocol stack (e.g., wireless protocol stack 406, 521, etc.) running on the modem processor. Examples, of RAN statistics and/or events may include a delay indication, a delay jitter indication, a packet loss rate, a handover event, a data rate, an available data rate, a recommended bit rate, a radio link failure, a discontinuous reception event, a service interruption, a loss or delay of an application layer packet of a particular type, etc.

In block 704, the modem processor may perform operations to receive RAN statistics and/or event messages from a network device (e.g., 110a-110d, 350, 401, 415, etc.). Examples of the RAN statistics and/or event message received from a network device may include a packet loss report, a packet delay report, a packet delay jitter report, a packet delay variation report, a bit rate report, a network event message, a recommended bit rate message including a time interval during which a recommended bit rate is valid, a UL per-packet loss report, etc. The various reports received from the network device may be different type messages, such as MAC CEs or any other type message or report.

In block 706, the modem processor may perform operations to receive a query for one or more RAN statistics and/or events of interest from an application processor (e.g., application processor 216, 503, etc.). For example, the query may be a query as discussed with reference to block 604 of method 600 (FIG. 6).

In block 708, the modem processor may perform operations to generate a RAN statistics and/or events message including one or more RAN statistics and/or events of interest based at least in part on the received query. As examples, RAN statistics and/or events of interest may include a delay indication, a delay jitter indication, a packet loss rate, a handover event, a data rate, an available data rate, a recommended bit rate, a radio link failure, a discontinuous reception event, a service interruption, a loss or delay of an application layer packet of a particular type, etc.

In block 710, the modem processor may perform operations to send the RAN statistics and/or events message including one or more RAN statistics and/or events of interest to the application processor.

Figure 8:
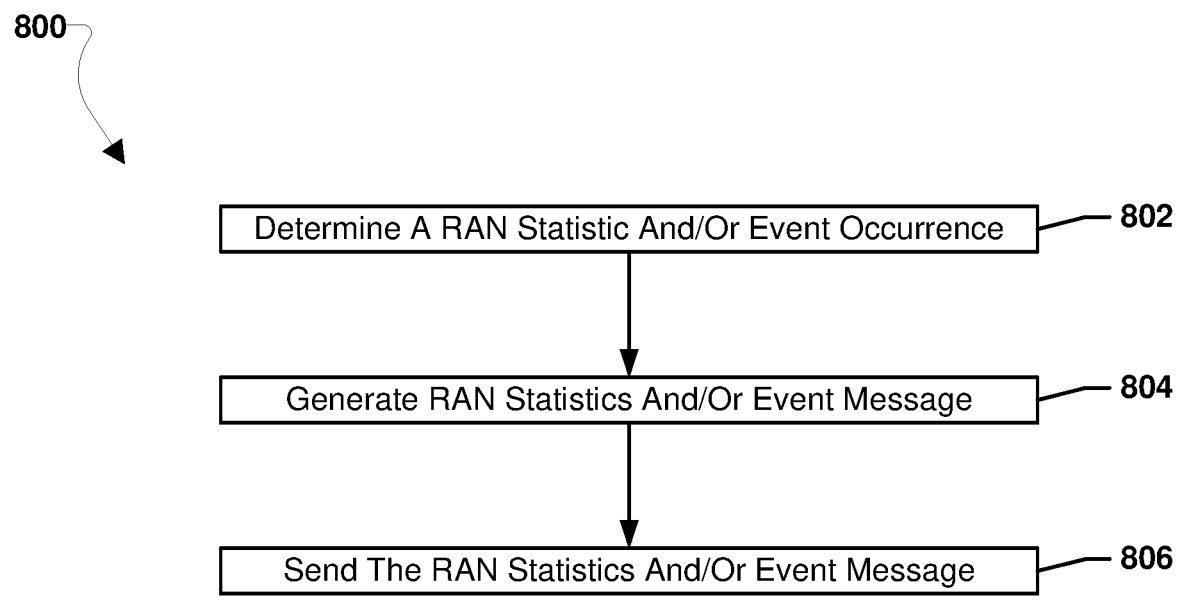
FIG. 8 is a process flow diagram illustrating a method performed by a processor of a network device for supporting application level discovery of RAN statistics and/or events in accordance with some embodiments.

FIG. 8 shows a process flow diagram illustrating an example method 800 for supporting application level discovery of RAN statistics and/or events in accordance with various embodiments. With reference to FIGS. 1-8, the method 800 may be implemented by processor of a network device (e.g., 110a-110d, 350, 401, 415). In various embodiments, the operations of method 800 may be performed in conjunction with the operations of methods 600 (FIG. 6) and/or 700 (FIG. 7).

In block 802, the processor of the network device may determine a RAN statistic and/or event occurrence. Examples of the RAN statistics and/or event occurrences may include detecting a packet loss, detecting a packet delay, calculating a packet delay jitter, calculating a packet delay variation, changing a bit rate, reaching a set periodicity, changing a recommended bit rate, detecting a UL per-packet loss, receiving a request for RAN statistics and/or events reporting from a wireless device, etc.

In block 804, the processor of the network device may generate a RAN statistics and/or event message. Examples of the RAN statistics and/or event messages may include a packet loss report, a packet delay report, a packet delay jitter report, a packet delay variation report, a bit rate report, a network event message, a recommended bit rate message including a time interval during which a recommended bit rate is valid, a UL per-packet loss report, etc. The various reports may be different type messages, such as MAC CEs or any other type message or report In block 806, the processor of the network device may send the RAN statistics and/or event message. For example, the network device may send the RAN statistics and/or event message to the wireless device.

Figure 9:
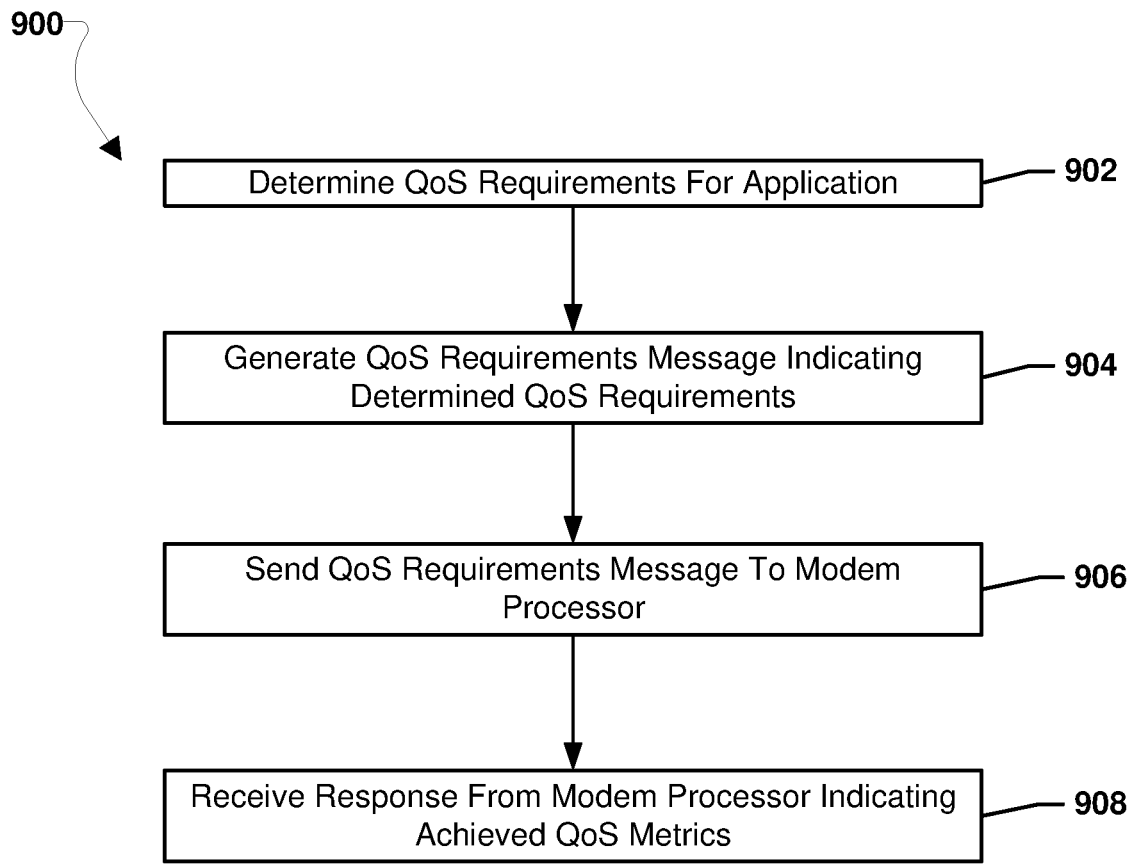
FIG. 9 is a process flow diagram illustrating a method performed by an application processor of a wireless device for supporting application level signaling of Quality of Service (QoS) requirements in accordance with some embodiments.

FIG. 9 shows a process flow diagram illustrating an example method 900 for supporting application level signaling of QoS requirements in accordance with some embodiments. With reference to FIGS. 1-9, the method 900 may be implemented by an application processor (e.g., application processor 216, 503, etc.) and a modem processor (e.g., 212, 252) of a wireless device (e.g., wireless device 120a-120e, 200, 320, 401, 415, 502, 502A, 502B, etc.). In some embodiments, the operations of method 900 may be performed in conjunction with the operations of methods 600 (FIG. 6), 700 (FIG. 7), and/or 800 (FIG. 8).

In block 902, the application processor may perform operations to determine QoS requirements for an application (e.g., a communication application 507, etc.). QoS requirements for an application may include a volume of data, a maximum bit rate, an average bit rate, a maximum delay, an average delay, a maximum delay jitter, an average of an absolute value of a delay jitter, a maximum packet loss rate, or an average packet loss rate. QoS requirements may be associated with various attributes, such as settings of the application, user preferences, device capabilities, etc. In some embodiments, QoS requirements may be determined at least in part using a model mapping a set of QoS metrics to a QoE associated with a target QoE. As an example, the QoE may be measured by a MOS.

In block 904, the application processor may perform operations to generate a QoS requirements message indicating determined QoS requirements.

In block 906, the application processor may perform operations to send the QoS requirements message to a modem processor (e.g., modem processor 212, 252, 272, 505, etc.).

In block 908, the application processor may perform operations to receive a response from the modem processor. The response may indicate whether the QoS requirements were achieved and/or the actual QoS metrics achieved by the modem processor.

Figure 10:
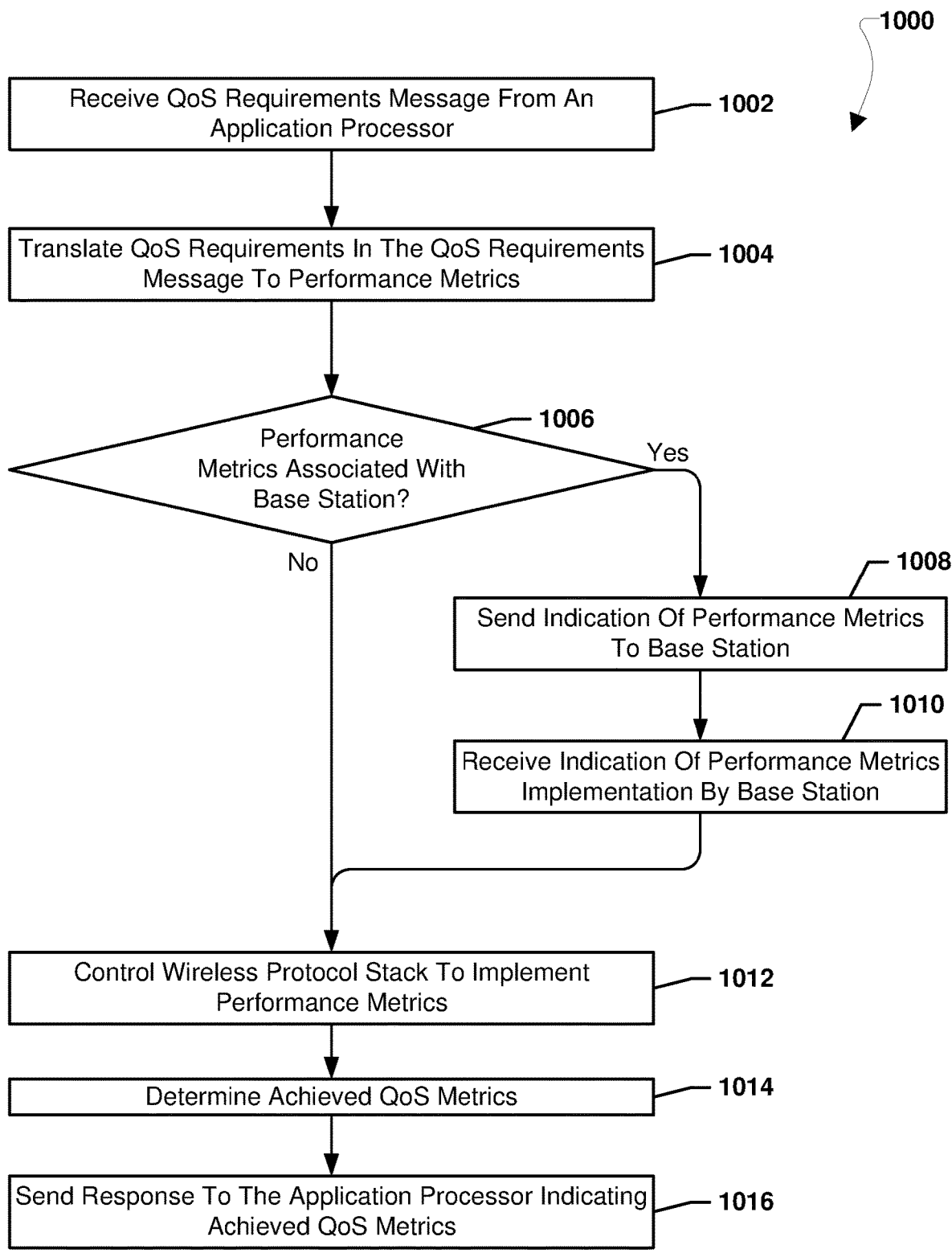
FIG. 10 is a process flow diagram illustrating a method performed by a modem processor of a wireless device for supporting application level signaling of QoS requirements in accordance with some embodiments.

FIG. 10 shows a process flow diagram illustrating an example method 1000 for supporting application level signaling of QoS requirements in accordance with some embodiments. With reference to FIGS. 1-10, the method 1000 may be implemented by a modem processor (e.g., modem processor 212, 252, 272, 505, etc.) of a wireless device (e.g., wireless device 120a-120e, 200, 320, 401, 415, 502, 502A, 502B, etc.). In some embodiments, the operations of method 1000 may be performed in conjunction with the operations of methods 600 (FIG. 6), 700 (FIG. 7), 800 (FIG. 8), and/or 900 (FIG. 9).

In block 1002, the modem processor may perform operations to receive a QoS requirements message from an application processor (e.g., application processor 216, 503, etc.). A QoS requirements message may indicate QoS requirements, such as a volume of data, a maximum bit rate, an average bit rate, a maximum delay, an average delay, a maximum delay jitter, an average of an absolute value of a delay jitter, a maximum packet loss rate, or an average packet loss rate. In some embodiments, QoS requirements may be determined at least in part using a model mapping a set of QoS metrics to a QoE associated with a target QoE. As an example, the QoE may be measured by a MOS. As an example, the QoS requirements message may be the QoS requirements message sent in block 904 of method 900 (FIG. 9).

In block 1002, the modem processor may perform operations to translate QoS requirements in the QoS requirements message to performance metrics. For example, the modem processor may translate the QoS requirements as indicated from the application level to performance metrics for one or more layers of the wireless protocol stack (e.g., wireless protocol stack 406, 521, etc.), such as performance metrics for a SDAP layer, PDCP layer, RLC layer, MAC layer, PHY layer, etc. Additionally, or alternatively, the modem processor may translate the QoS requirements to performance metrics associated with a network device, such as performance metrics controlled by network device operations.

In determination block 1004, the modem processor may perform operations to determine whether performance metrics are associated with a network device (e.g., 110a-110d, 350, 401, 415).

In response to determining that performance metrics are associated with the network device (i.e., determination block 1006="Yes"), the modem processor may perform operations to send an indication of performance metrics to a network device (e.g., 110a-110d, 350, 401, 415, etc.) in block 1008.

In block 1010, the modem processor may perform operations to receive an indication of performance metrics implementation by the network device. The indication of performance metrics implementation may indicate whether or not the network device accepted or rejected the performance metrics.

In response to determining that no performance metrics are associated with the network device (i.e., determination block 1006="No") or in response to receiving an indication of performance metrics implementation by the network device in block 1010, the modem processor may perform operations to control a wireless protocol stack (e.g., wireless protocol stack 406, 521, etc.) to implement the performance metrics in block 1012. As an example, the modem processor may perform logical channel prioritization based on the performance metrics.

In block 1014, the modem processor may perform operations to determine achieved QoS metrics. For example, the modem processor may determine the actual QoS metrics resulting from attempting to implement the QoS requirements.

In block 1016, the modem processor may perform operations to send a response to the application processor indicating the achieved QoS metrics.

Figure 11:
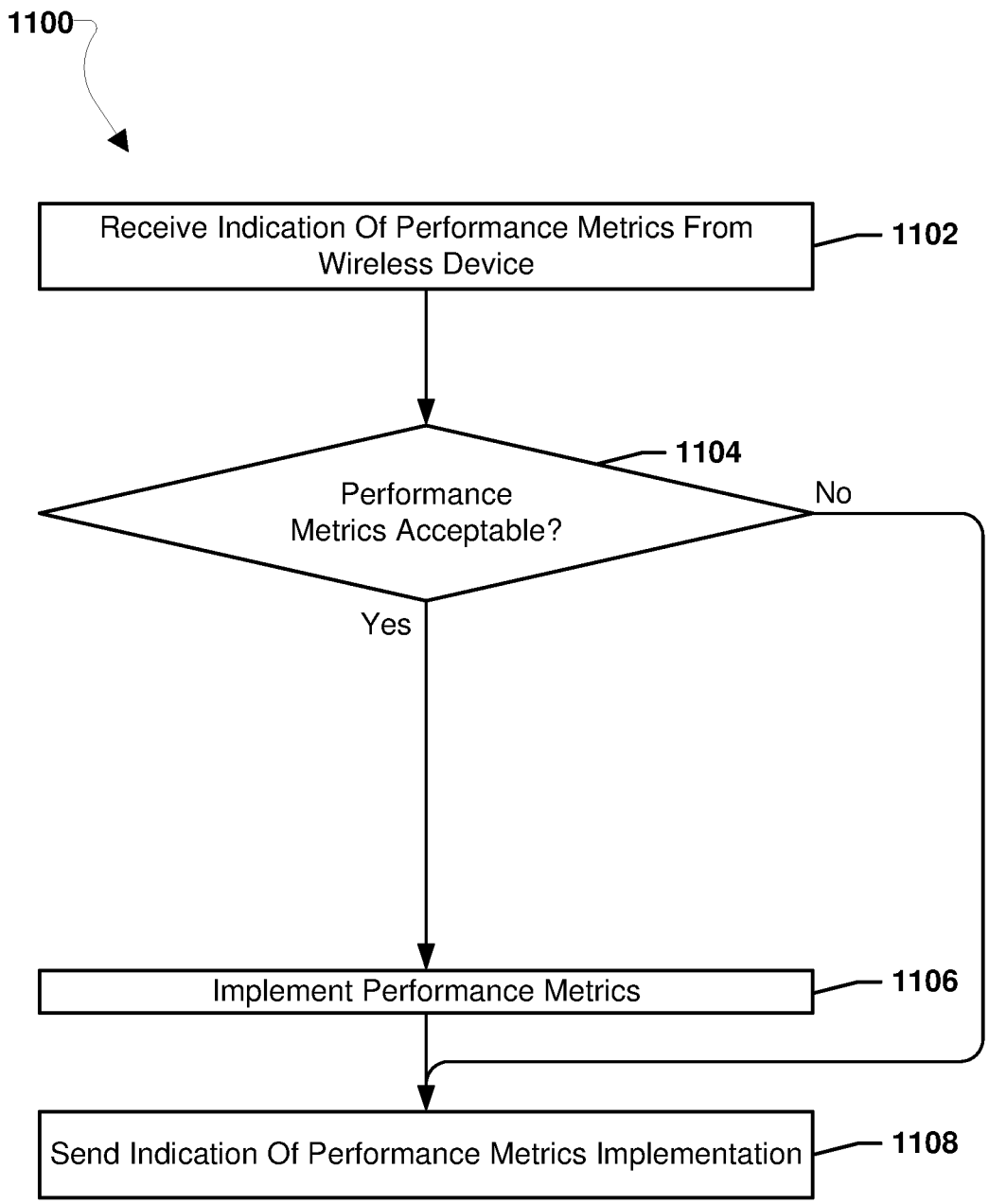
FIG. 11 is a process flow diagram illustrating a method performed by a processor of a network device for supporting application level signaling of QoS requirements in accordance with some embodiments.

FIG. 11 shows a process flow diagram illustrating an example method 1100 for supporting application level signaling of QoS requirements in accordance with some embodiments. With reference to FIGS. 1-11, the method 1100 may be implemented by processor of a network device (e.g., 110a-110d, 350, 401, 415). In some embodiments, the operations of method 1100 may be performed in conjunction with the operations of methods 600 (FIG. 6), 700 (FIG. 7), 800 (FIG. 8), 900 (FIG. 9), and/or 1000 (FIG. 10).

In block 1102, the processor of the network device may receive an indication of performance metrics from a wireless device (e.g., wireless device 120a-120e, 200, 320, 401, 415, 502, 502A, 502B, etc.).

In determination block 1104, the processor of the network device may determine whether the performance metrics are acceptable. In some embodiments, the network device of the RAN, such as a network node, an RU, gNB, eNB, AP, etc., may accept or reject one or more of any performance metrics sent by the modem processor of the wireless device, for example based on network device capabilities and/or resource availability.

In response to determining the performance metrics are acceptable (i.e., determination block 1104="Yes"), the processor of the network device may implement the performance metrics in block 1106. In some embodiments, the network device of the RAN, such as a network node, an RU, gNB, eNB, AP, etc., may allocate resources based at least in part on the performance metrics.

In response to determining the performance metrics are not acceptable (i.e., determination block 1104="No") or in response to implementing the performance metrics in block 1106, the processor of the network device may send an indication of the performance metrics implementation in block 1108. As examples, the indication of the performance metrics implementation may indicate the performance metrics were rejected by the network device, the performance metrics were accepted by the network device, the achieved QoS metrics by the network device (e.g., such as achieved bit rate, delay, delay jitter, packet loss, etc.), etc.

Figure 12:
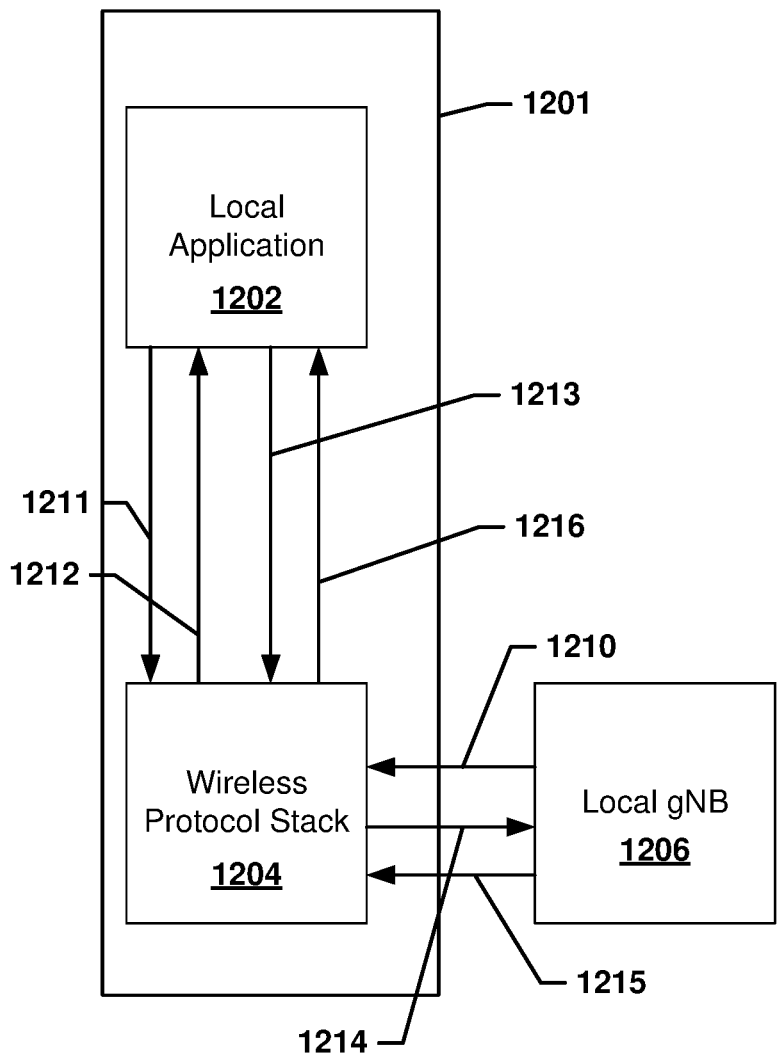
FIG. 12 is a call flow diagram illustrating example interactions between a local application, a wireless protocol stack, and a first network device for supporting application level discovery of RAN statistics and/or events and for supporting application level signaling of QoS requirements in accordance with some embodiments.

FIG. 12 is a call flow diagram illustrating example interactions between a local application 1202 (e.g., communication application 507, etc.), a wireless protocol stack 1204 (e.g., wireless protocol stack 406, 521, etc.), and a first network device (e.g., 110a-110d, 350, 401, 415) for supporting application level discovery of RAN statistics and/or events and for supporting application level signaling of QoS requirements in accordance with some embodiments. With reference to FIGS. 1-12, the local application 1202 and wireless protocol stack 1204 may be running on one or more processors (e.g., application processor 216, 503, modem processor 212, 252, 272, 505, etc.) of a first wireless device 1201 (e.g., wireless device 120a-120e, 200, 320, 401, 415, 502, 502A, 502B, etc.). In some embodiments, the interactions illustrated in FIG. 12 may be interactions according to one or more operations of methods 600 (FIG. 6), 700 (FIG. 7), 800 (FIG. 8), 900 (FIG. 9), 1000 (FIG. 10), and/or 1100 (FIG. 11). As a specific example, the network device 1206 may be a gNB of a 5G NR RAN. However, the network device 1206 may be any type of network device, such as an RU, eNB, AP, etc.

In operation 1210, the network device 1206 may send one or more RAN statistics and/or event messages to the wireless protocol stack 1204 of the first wireless device 1201. As an example, the network device 1206 may send MAC CEs and/or other type reports indicating RAN statistics and/or RAN events to the wireless device 1201.

In operation 1211, the local application 1202 may send a query for one or more RAN statistics and/or events of interest to the wireless protocol stack 1204 of the first wireless device 1201.

In operation 1212, the wireless protocol stack 1204 may send a RAN statistics and/or events message including one or more RAN statistics and/or events of interest to the local application of the first wireless device 1201.

In operation 1213, the local application may send a QoS requirements message indicating determined QoS requirements for the local application 1202 to the wireless protocol stack 1204 of the first wireless device 1201.

In operation 1214, the wireless protocol stack 1204 may translate the QoS requirements indicated in the QoS requirements message to performance metrics and send performance metrics to the first network device 1206. Additionally, the wireless protocol stack 1204 may implement the translated performance metrics itself, such as performance metrics for a SDAP layer, PDCP layer, RLC layer, MAC layer, PHY layer, etc.

In operation 1215, the first network device 1206 may send an indication of the performance metrics implementation to the wireless protocol stack 1204 of the first wireless device 1201.

In operation 1216, the wireless protocol stack 1204 may send a response to the local application 1202 indicating achieved QoS metrics. The achieved QoS metrics may be achieved QoS metrics of the wireless protocol stack 1204 and/or the network device 1206.

Figure 13A:
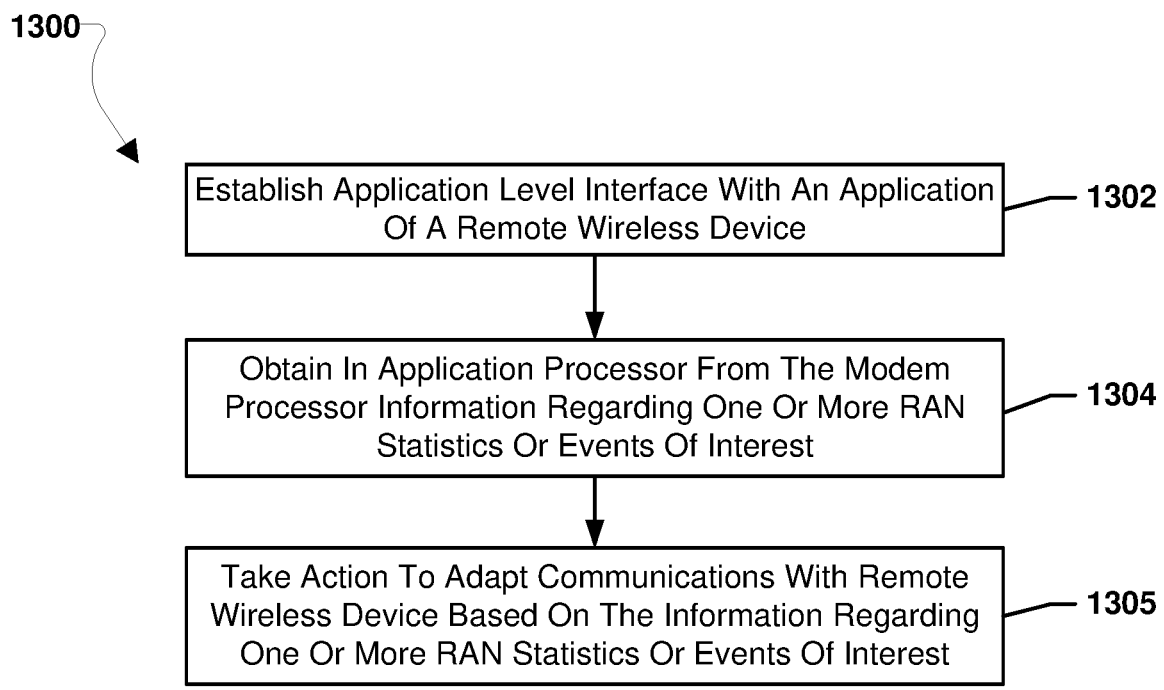
FIGS. 13A and 13B are process flow diagrams illustrating methods performed by an application processor of a wireless device for supporting application level discovery of RAN statistics and/or events between a first and second wireless device in accordance with some embodiments.

FIG. 13A shows a process flow diagram illustrating an example method 1300 for supporting application level discovery of RAN statistics and/or events in accordance with some embodiments. With reference to FIGS. 1-13A, the method 1300 may be implemented by an application processor (e.g., application processor 216, 503, etc.) and a modem processor (e.g., 212, 252) of a wireless device (e.g., wireless device 120a-120e, 200, 320, 401, 415, 502, 502A, 502B, 1201, etc.). The operations of method 1300 may be performed in conjunction with the operations of methods 600 (FIG. 6), 700 (FIG. 7), 800 (FIG. 8), 900 (FIG. 9), 1000 (FIG. 10), and/or 1100 (FIG. 11).

In block 1302, the application processor may perform operations to establish an application level interface with an application (e.g., communication application 507, etc.) of a second wireless device (e.g., wireless device 120a-120e, 200, 320, 401, 415, 502, 502A, 502B, 1201, etc.).

In block 1304, the application processor may obtain from the modem processor information regarding one or more RAN Statistics of Events of Interest. In some embodiments, the modem processor may determine the information based on monitoring current communications and provide that information to the application processor. In some embodiments, the modem processor may obtain the information from another remote (i.e., second) wireless device via the exchange of messages as described herein. In some embodiments, the modem processor may obtain the information from a network device of a connected RAN.

In block 1305, the application processor may take an action to adapt communications with the remote wireless device based on the information regarding one or more RAN statistics or events of interest. In some embodiments, the application processor may take an action adapt data output or data processing in view of RAN statistics or events of interest of the second wireless device as received by the modem processor as described in more detail herein. In some embodiments, the application processor may transmit RAN statistics or events of interest obtained from the modem processor to the second wireless device as described in more detail herein.

Figure 13B:
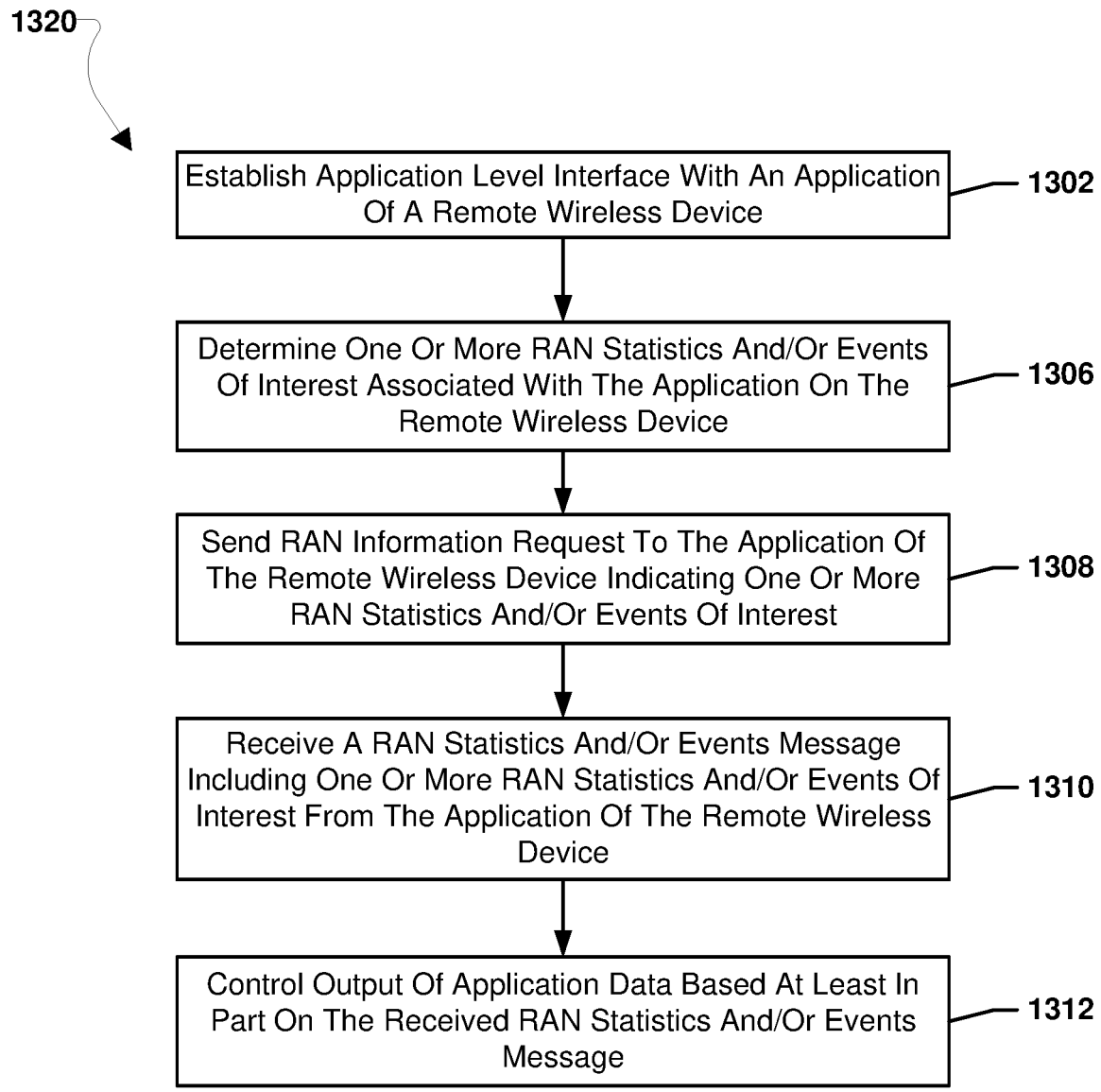

FIG. 13B shows a process flow diagram illustrating an example method 1320 for supporting application level discovery of RAN statistics and/or events in accordance with some embodiments. With reference to FIGS. 1-13B, the method 1320 may be implemented by an application processor (e.g., application processor 216, 503, etc.) and a modem processor (e.g., 212, 252) of a wireless device (e.g., wireless device 120a-120e, 200, 320, 401, 415, 502, 502A, 502B, 1201, etc.). The operations of method 1300 may be performed in conjunction with the operations of methods 600 (FIG. 6), 700 (FIG. 7), 800 (FIG. 8), 900 (FIG. 9), 1000 (FIG. 10), and/or 1100 (FIG. 11).

In block 1302, the application processor may perform operations to establish an application level interface with an application (e.g., communication application 507, etc.) of a second wireless device (e.g., wireless device 120a-120e, 200, 320, 401, 415, 502, 502A, 502B, 1201, etc.).

In block 1306, the application processor may perform operations to determine one or more RAN statistics and/or events of interest associated with the application on the second wireless device. As examples, RAN statistics and/or events of interest may include a delay indication, a delay jitter indication, a packet loss rate, a handover event, a data rate, an available data rate, a recommended bit rate, a radio link failure, a discontinuous reception event, a service interruption, a loss or delay of an application layer packet of a particular type, etc.

In block 1308, the application processor may perform operations to send a RAN information request to the application of the second wireless device indicating one or more RAN statistics and/or events of interest.

In block 1310, the application processor may perform operations to receive a RAN statistics and/or events message including one or more RAN statistics and/or events of interest from the application of the second wireless device.

In block 1312, the application processor may perform operations to control an output of application data based at least in part on the received RAN statistics and/or events message. As a specific example, the RAN statistics and/or events of interest indicated in the RAN statistics and/or events message from the application of the second wireless device may be an indication that a handover event is occurring at the second wireless device. The application processor may perform operations such that an application running on the application processor (e.g., communication application 507, etc.) may stop sending data packets to the application of the second wireless device. As another specific example, the RAN statistics and/or events of interest indicated in the RAN statistics and/or events message from the application of the second wireless device may be an indication that a handover event has completed at the second wireless device. The application processor may perform operations such that an application running on the application processor (e.g., communication application 507, etc.) may increase the data transmission rate to the application of the second wireless device in response to receiving the indication that a handover event has completed.

Figure 14:
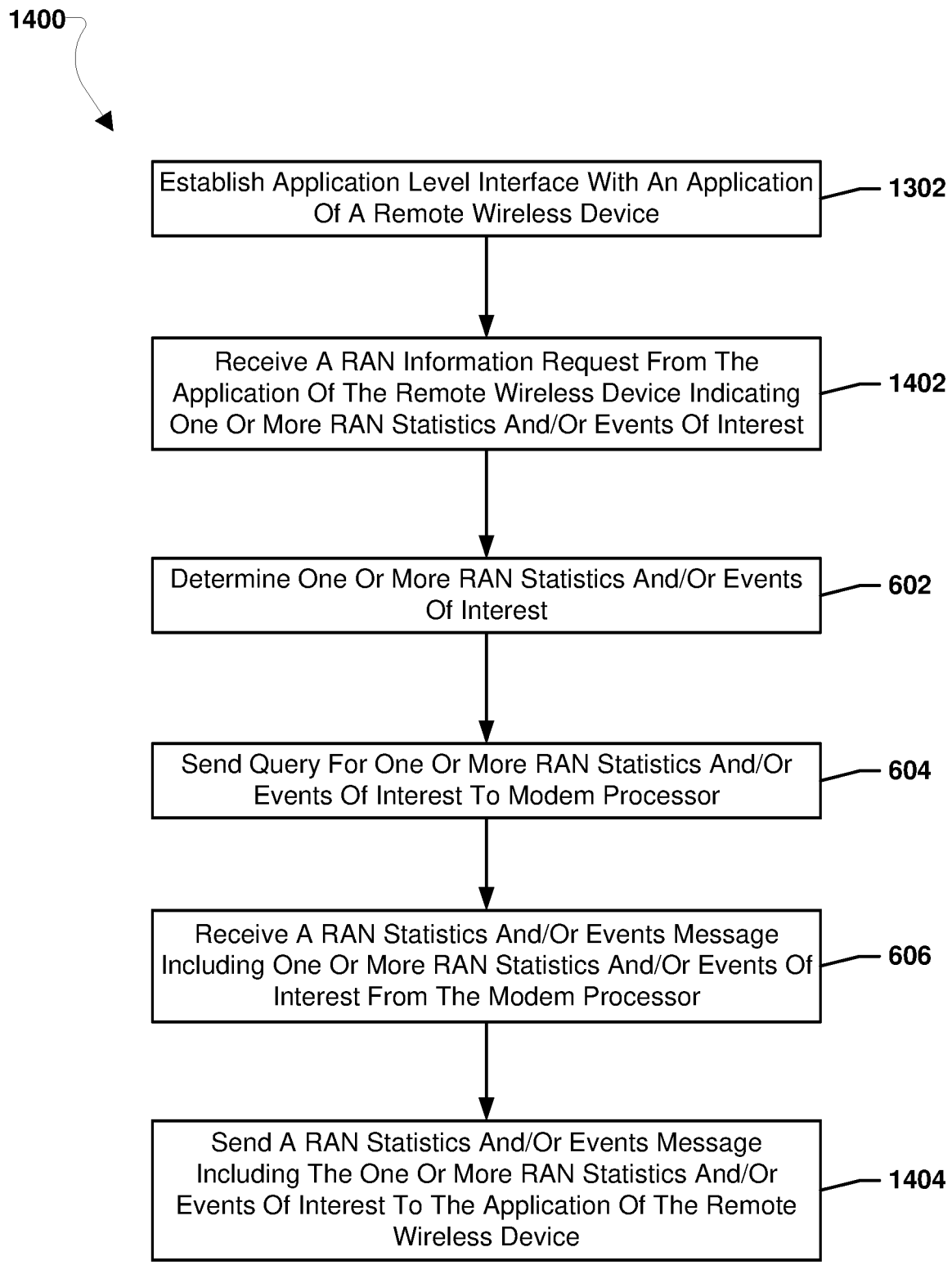
FIG. 14 is a process flow diagram illustrating a method performed by an application processor of a wireless device for supporting application level discovery of RAN statistics and/or events between a first and second wireless device in accordance with some embodiments.

FIG. 14 shows a process flow diagram illustrating an example method 1400 for supporting application level discovery of RAN statistics and/or events in accordance with some embodiments. With reference to FIGS. 1-14, the method 1400 may be implemented by an application processor (e.g., application processor 216, 503, etc.) and a modem processor (e.g., 212, 252) of a wireless device (e.g., wireless device 120a-120e, 200, 320, 401, 415, 502, 502A, 502B, 1201, etc.). The operations of method 1400 may be performed in conjunction with the operations of methods 600 (FIG. 6), 700 (FIG. 7), 800 (FIG. 8), 900 (FIG. 9), 1000 (FIG. 10), 1100 (FIG. 11), and/or 1300 (FIG. 13).

In block 1302, the application processor may perform operations to establish an application level interface with an application (e.g., communication application 507, etc.) of a second wireless device (e.g., wireless device 120a-120e, 200, 320, 401, 415, 502, 502A, 502B, 1201, etc.) as discussed with reference to method 1300 (FIG. 13).

In block 1402, the application processor may perform operations to receive a RAN information request from the application of the second wireless device indicating one or more RAN statistics and/or events of interest. As examples, RAN statistics and/or events of interest may include a delay indication, a delay jitter indication, a packet loss rate, a handover event, a data rate, an available data rate, a recommended bit rate, a radio link failure, a discontinuous reception event, a service interruption, a loss or delay of an application layer packet of a particular type, etc.

In blocks 602-606, the application processor may perform operations of like numbered blocks of method 600 (FIG. 6) to determine one or more RAN statistics and/or events, send a query for one or more RAN statistics and/or events of interest to a modem processor (e.g., modem processor 212, 252, 272, 505, etc.), and receive a RAN statistics and/or events message including one or more RAN statistics and/or events of interest from the modem processor.

In block 1404, the application processor may perform operations to send a RAN statistics and/or events message including the one or more RAN statistics and/or events of interest to the application of the second wireless device.

Figure 15:
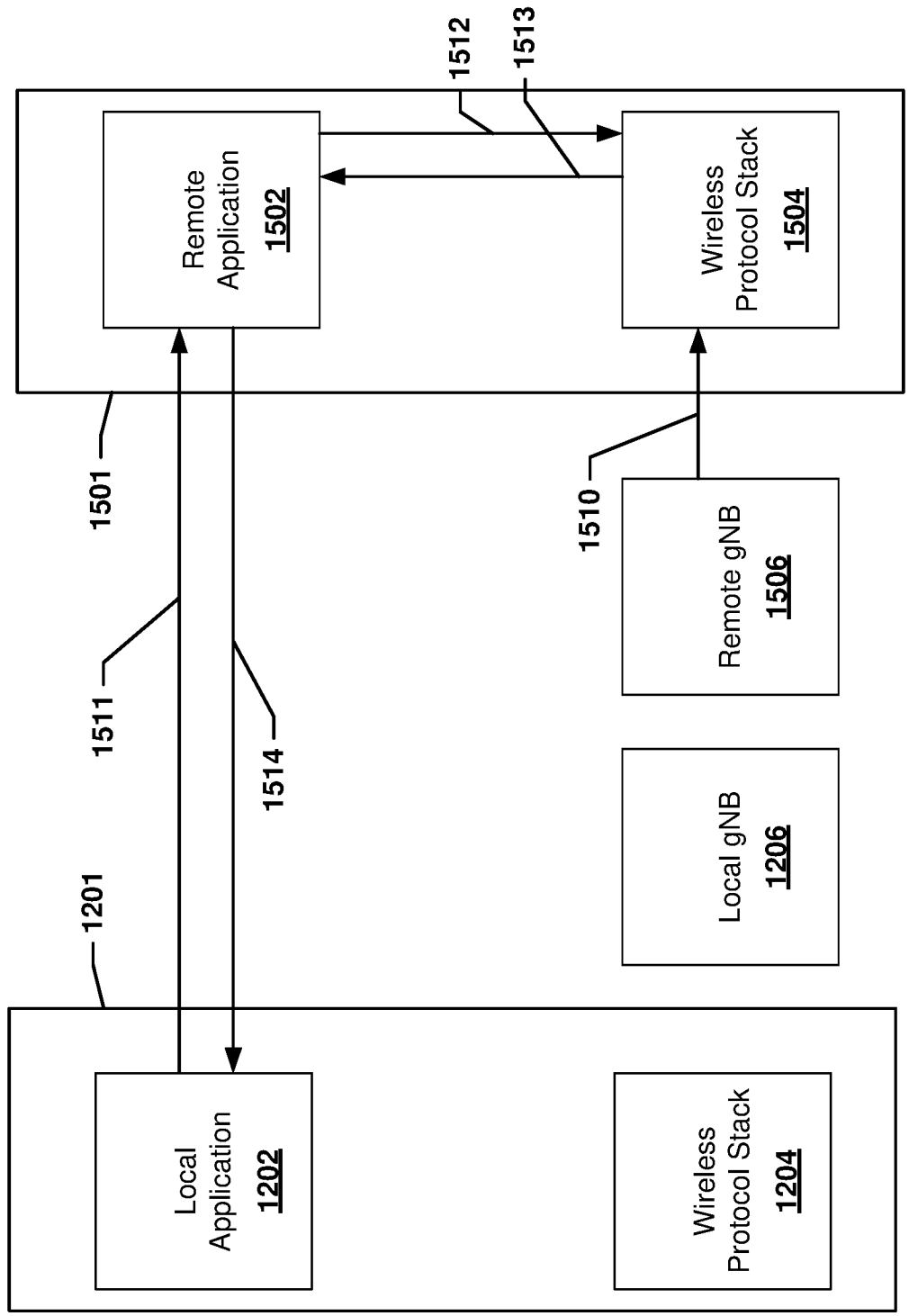
FIG. 15 is a call flow diagram illustrating example interactions between a local application and a remote application for supporting application level discovery of RAN statistics and/or events between a first and second wireless device in accordance with some embodiments.

FIG. 15 is a call flow diagram illustrating example interactions between a local application 1202 running on a first wireless device application processor and a remote application (e.g., communication application 507, etc.) running on a second wireless device application processor for supporting application level discovery of RAN statistics in accordance with some embodiments. With reference to FIGS. 1-15, the remote application 1502 may be an application running on one or more processors (e.g., application processor 216, 503, modem processor 212, 252, 272, 505, etc.) of a second wireless device 1501 (e.g., wireless device 120a-120e, 200, 320, 401, 415, 502, 502A, 502B, etc.) separate or remote from the first wireless device 1201. The second wireless device 1501 and the first wireless device 1201 may be in wireless communication with one another such that an application level interface between the wireless devices 1201 and 1501 may be established. A wireless protocol stack 1504 (e.g., wireless protocol stack 406, 521, etc.) may be running on one or more processors (e.g., application processor 216, 503, modem processor 212, 252, 272, 505, etc.) of the second wireless device 1501 (e.g., wireless device 120a-120e, 200, 320, 401, 415, 502, 502A, 502B, etc.). The second wireless device 1501 may be connected to a second network device 1506. The second network device 1506 may be part of a separate RAN from the first network device 1206. The interactions illustrated in FIG. 15 may be interactions according to one or more operations of methods 600 (FIG. 6), 700 (FIG. 7), 800 (FIG. 8), 900 (FIG. 9), 1000 (FIG. 10), 1100 (FIG. 11), 1300 (FIG. 13), and/or 1400 (FIG. 14). As a specific example, the network device 1206 may be a gNB of a 5G NR RAN. However, the network device 1206 may be any type of network device, such as an RU, eNB, AP, etc.

In operation 1511, the local application 1202 of the first wireless device 1201 may send a RAN information request to the remote application 1502 of the second wireless device 1501. The RAN information request may indicate RAN statistics and/or events of interest, such as a delay indication, a delay jitter indication, a packet loss rate, a handover event, a data rate, an available data rate, a recommended bit rate, a radio link failure, a discontinuous reception event, a service interruption, a loss or delay of an application layer packet of a particular type, etc.

In operation 1512, the remote application 1502 may send a query for one or more RAN statistics of interest indicated in the RAN information request to the wireless protocol stack 1504.

In operation 1513, the wireless protocol stack 1504 may send a RAN statistics and/or events message including one or more RAN statistics and/or events of interest to the remote application 1502.

In operation 1514, the remote application 1502 may send a RAN information response message including one or more RAN statistics and/or events of interest to the local application 1202.

Figure 16:
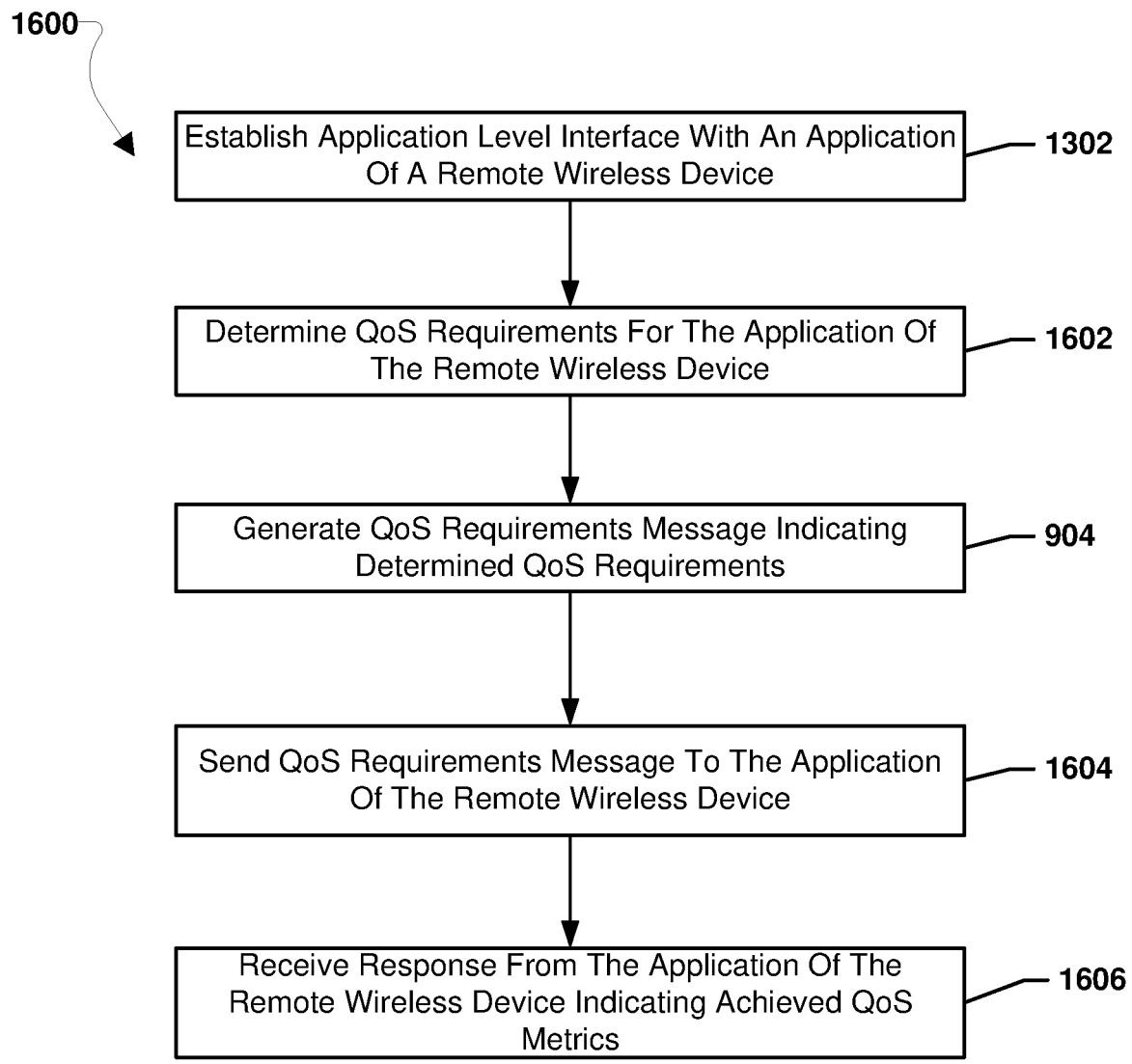
FIG. 16 is a process flow diagram illustrating a method performed by an application processor of a wireless device for supporting application level signaling of QoS requirements between a first and second wireless device in accordance with some embodiments.

FIG. 16 shows a process flow diagram illustrating an example method 1600 for supporting application level signaling of QoS requirements in accordance with some embodiments. With reference to FIGS. 1-16, the method 1600 may be implemented by an application processor (e.g., application processor 216, 503, etc.) of a wireless device (e.g., wireless device 120a-120e, 200, 320, 401, 415, 502, 502A, 502B, 1201, 1501, etc.). The operations of method 1600 may be performed in conjunction with the operations of methods 600 (FIG. 6), 700 (FIG. 7), 800 (FIG. 8), 900 (FIG. 9), 1000 (FIG. 10), 1100 (FIG. 11), 1300 (FIG. 13), and/or 1400 (FIG. 14).

In block 1302, the application processor may perform operations to establish an application level interface with an application (e.g., communication application 507, etc.) of a second wireless device (e.g., wireless device 120a-120e, 200, 320, 401, 415, 502, 502A, 502B, 1201, etc.) as discussed with reference to method 1300 (FIG. 13).

In block 1602, the application processor may perform operations to determine QoS requirements for the application of the second wireless device. QoS requirements for an application of the second wireless device may include a volume of data, a maximum bit rate, an average bit rate, a maximum delay, an average delay, a maximum delay jitter, an average of an absolute value of a delay jitter, a maximum packet loss rate, or an average packet loss rate. QoS requirements for the application of the second wireless device may be selected to attempt to ensure application operations at the first wireless device and/or second wireless device meet or exceed a minimum quality threshold, such as a quality threshold associated with various attributes, such as application settings, user preferences, service requirements, etc. In some embodiments, QoS requirements may be determined at least in part using a model mapping a set of QoS metrics to a Quality of Experience (QoE) associated with a target QoE. As an example, the QoE may be measured by a MOS.

In block 904, the application processor may perform operations to generate a QoS requirements message indicating the determined QoS requirements as discussed with reference to method 900 (FIG. 9).

In block 1604, the application processor may perform operations to send a QoS requirements message to the application of the second wireless device.

In block 1606, the application processor may perform operation to receive a response from the application of the second wireless device indicating QoS metrics achieved by the second wireless device.

Figure 17:
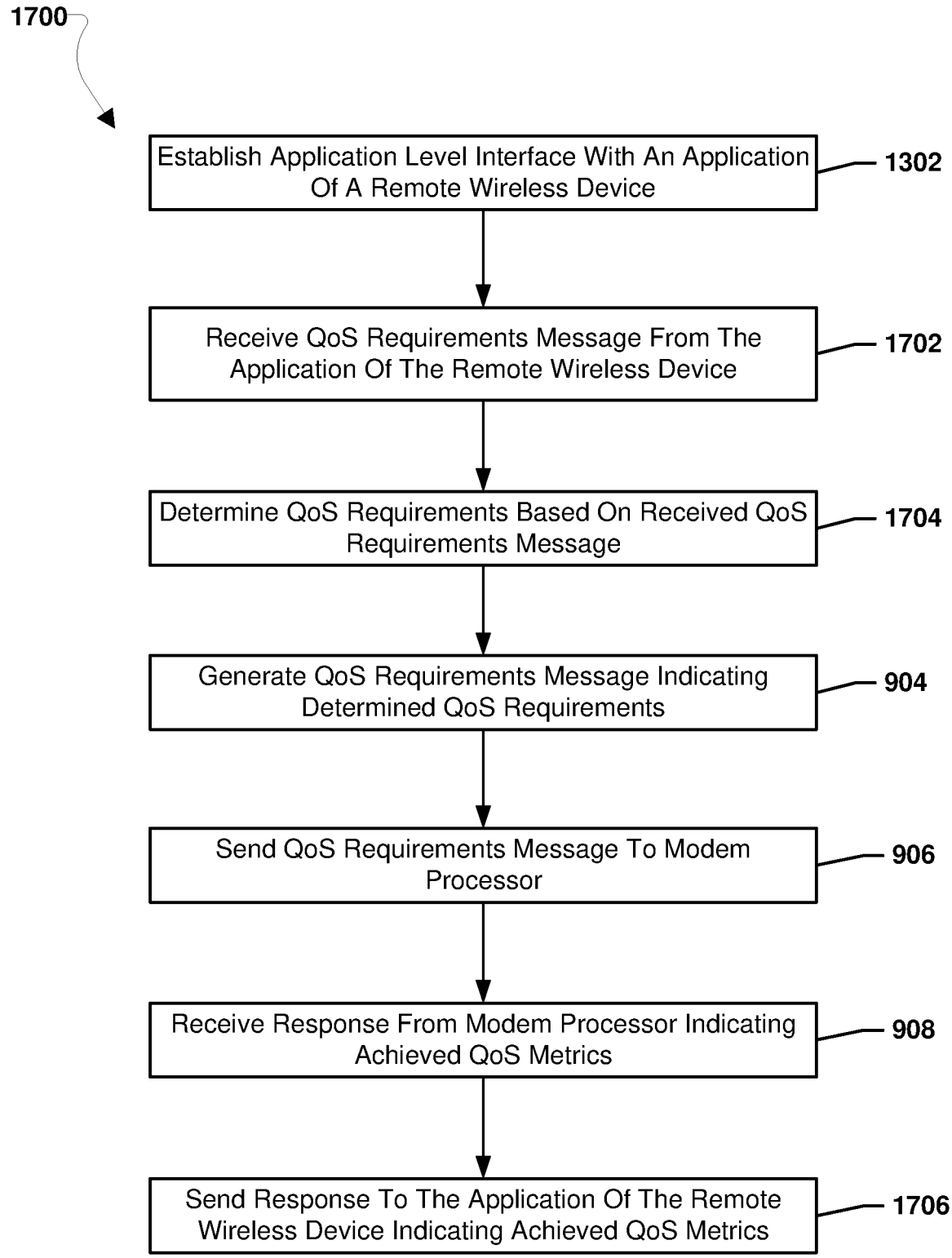
FIG. 17 is a process flow diagram illustrating a method performed by an application processor of a wireless device for supporting application level signaling of QoS requirements between a first and second wireless device in accordance with some embodiments.

FIG. 17 shows a process flow diagram illustrating an example method 1700 for supporting application level signaling of QoS requirements in accordance with some embodiments. With reference to FIGS. 1-17, the method 1700 may be implemented by an application processor (e.g., application processor 216, 503, etc.) and a modem processor (e.g., 212, 252) of a wireless device (e.g., wireless device 120a-120e, 200, 320, 401, 415, 502, 502A, 502B, 1201, 1501, etc.). The operations of method 1700 may be performed in conjunction with the operations of methods 600 (FIG. 6), 700 (FIG. 7), 800 (FIG. 8), 900 (FIG. 9), 1000 (FIG. 10), 1100 (FIG. 11), 1300 (FIG. 13), 1400 (FIG. 14), and/or 1600 (FIG. 16).

In block 1302, the application processor may perform operations to establish an application level interface with an application (e.g., communication application 507, etc.) and a modem processor (e.g., 212, 252) of a second wireless device (e.g., wireless device 120a-120e, 200, 320, 401, 415, 502, 502A, 502B, 1201, etc.) as discussed with reference to method 1300 (FIG. 13).

In block 1702, the application processor may perform operations to receive a QoS requirements message from the application of the second wireless device. QoS requirements from the application of the second wireless device may include a volume of data, a maximum bit rate, an average bit rate, a maximum delay, an average delay, a maximum delay jitter, an average of an absolute value of a delay jitter, a maximum packet loss rate, or an average packet loss rate. QoS requirements from the application of the second wireless device may be selected to attempt to ensure application operations meet or exceed a minimum quality threshold, such as a quality threshold associated with various attributes, such as application settings, user preferences, service requirements, etc. In some embodiments, QoS requirements may be determined at least in part using a model mapping a set of QoS metrics to a Quality of Experience (QoE) associated with a target QoE. As an example, the QoE may be measured by a MOS.

In block 1704, the application processor may determine QoS requirements based on the received QoS requirements message. For example, the determined QoS requirements may be a volume of data, a maximum bit rate, an average bit rate, a maximum delay, an average delay, a maximum delay jitter, an average of an absolute value of a delay jitter, a maximum packet loss rate, or an average packet loss rate indicated in the QoS requirements message.

In blocks 904-908, the application processor may perform operations of like numbered blocks of method 900 (FIG. 9) to generate a QoS requirements message indicating the determined QoS requirements, send the QoS requirements message to a modem processor (e.g., modem processor 212, 252, 272, 505, etc.), and receive a response from the modem processor indicating achieved QoS metrics.

In block 1706, the application processor may send a response to the application of the second wireless device indicating the achieved QoS metrics.

Figure 18:
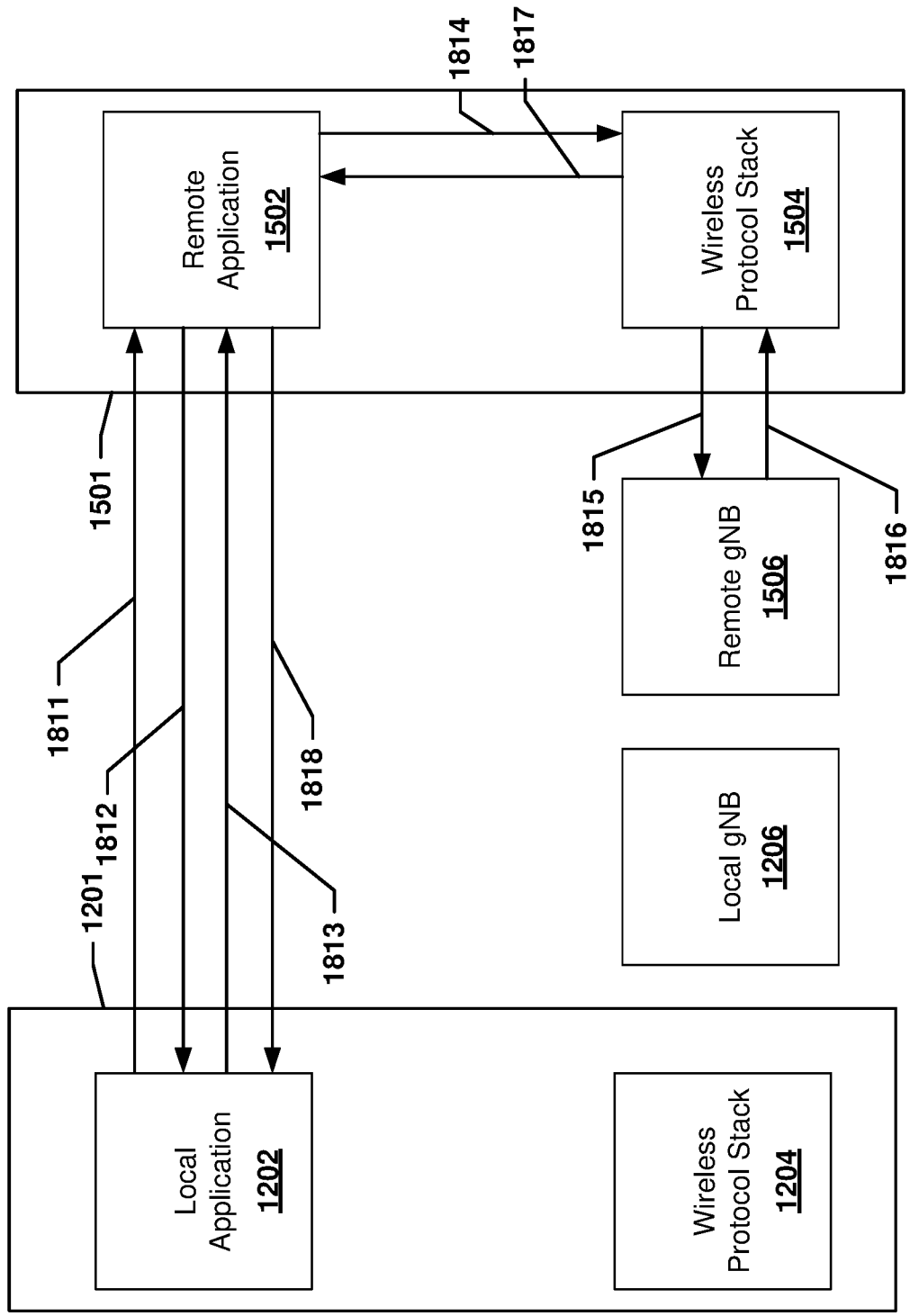
FIG. 18 is a call flow diagram illustrating example interactions between a local application and a remote application for supporting application level signaling of QoS requirements between a first and second wireless device in accordance with some embodiments.

FIG. 18 is a call flow diagram illustrating example interactions between a local application 1202 and a remote application 1502 for supporting application level signaling of QoS requirements in accordance with some embodiments. With reference to FIGS. 1-18, in various embodiments, the interactions illustrated in FIG. 18 may be interactions according to one or more operations of methods 600 (FIG. 6), 700 (FIG. 7), 800 (FIG. 8), 900 (FIG. 9), 1000 (FIG. 10), 1100 (FIG. 11), 1300 (FIG. 13), 1400 (FIG. 14), 1600 (FIG. 16), and/or 1700 (FIG. 17).

In operation 1811, the local application 1202 of the first wireless device 1201 may send a RAN type query to the remote application 1502 of the second wireless device 1501. The RAN type query may be a query asking whether the second wireless device 1501 is on a RAN and, if on a RAN, a request to provide the type of the RAN (e.g., LTE, 5G NR, WiFi, etc.).

In operation 1812, the remote application 1502 may send a RAN type response to the local application 1202 of the first wireless device 1201.

In operation 1813, the local application 1202 of the first wireless device 1201 may send QoS requirements for the remote application 1502 to the remote application 1502 of the second wireless device 1501. For example, the QoS requirements may be QoS requirements selected based on the type of the RAN indicated by the remote application 1502. QoS requirements may include a volume of data, a maximum bit rate, an average bit rate, a maximum delay, an average delay, a maximum delay jitter, an average of an absolute value of a delay jitter, a maximum packet loss rate, an average packet loss rate, etc.

In operation 1814, the remote application 1502 may send a QoS requirements message indicating the QoS requirements for the remote application 1502 to the wireless protocol stack 1504 of the second wireless device 1501.

In operation 1815, the wireless protocol stack 1504 may translate the QoS requirements indicated in the QoS requirements message to performance metrics and send performance metrics to the second network device 1506.

In operation 1816, the second network device 1506 may send an indication 1510 of the performance metrics implementation to the wireless protocol stack 1504 of the second wireless device 1501.

In operation 1817, the wireless protocol stack 1504 may send a response to the remote application 1502 indicating achieved QoS metrics.

In operation 1818, the remote application 1502 may send a response indicating the achieved QoS metrics to the local application 1202.

Figure 19:
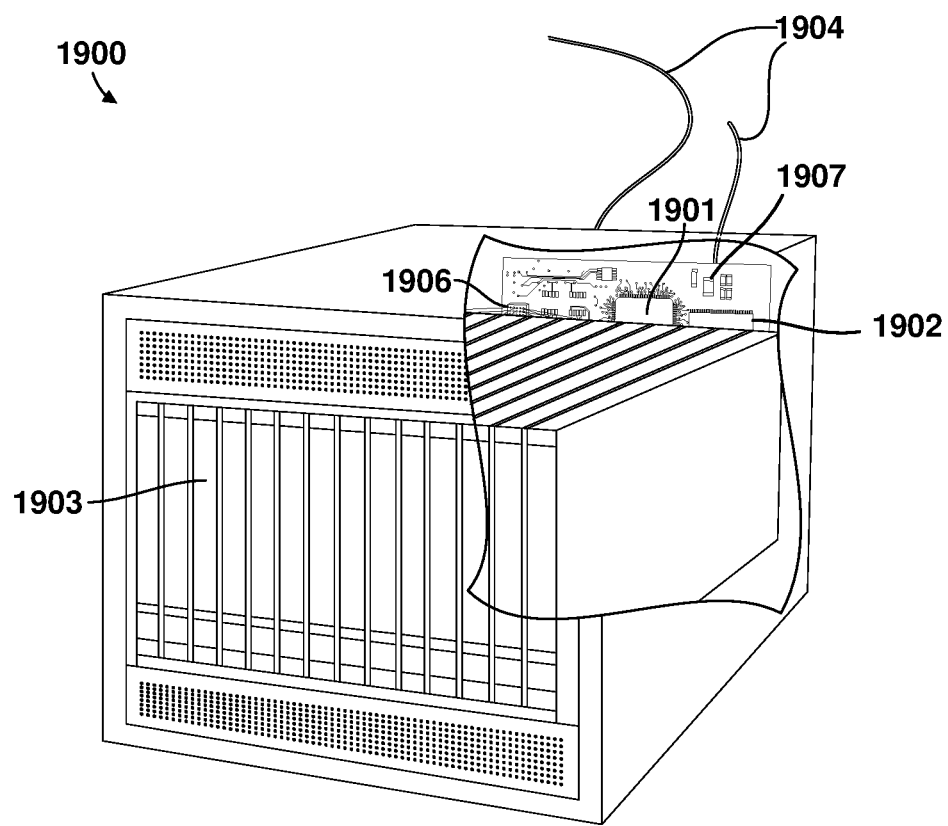
FIG. 19 is a component block diagram of a network device suitable for implementing any of the various embodiments.

Various embodiments may be implemented on a variety of wireless network devices, an example of which is illustrated in FIG. 19 in the form of a wireless network device 1900 functioning as a network element of a communication network, such as a network device (e.g., 110a-110d, 350, 401, 415, 504, 504A, 1206, 1506). Such network devices may include at least the components illustrated in FIG. 19. With reference to FIGS. 1-19, the network device 1900 may typically include a processor 1901 coupled to volatile memory 1902 and a large capacity nonvolatile memory, such as a disk drive 1903. The network device 1900 may also include a peripheral memory access device, such as a floppy disc drive, compact disc (CD) or digital video disc (DVD) drive 1906 coupled to the processor 1901. The network device 1900 may also include network access ports 1904 (or interfaces) coupled to the processor 1901 for establishing data connections with a network, such as the Internet and/or a local area network coupled to other system computers and servers. The network device 1900 may include one or more antennas 1907 for sending and receiving electromagnetic radiation that may be connected to a wireless communication link. The network device 1900 may include additional access ports, such as USB, Firewire, Thunderbolt, and the like for coupling to peripherals, external memory, or other devices.

Figure 20:
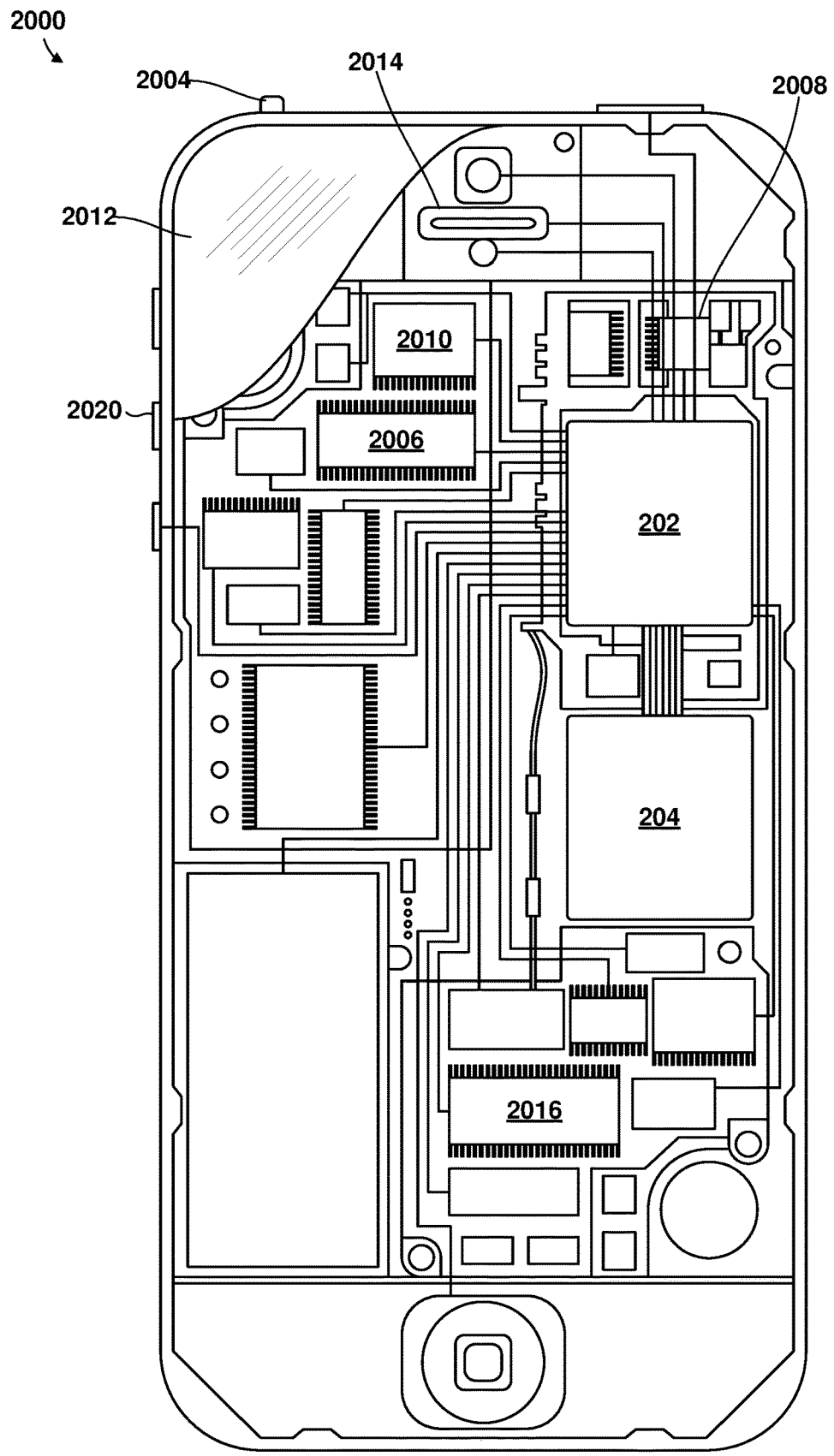
FIG. 20 is a component block diagram of a wireless communication device suitable for implementing any of the various embodiments.

Various embodiments may be implemented on a variety of wireless devices (e.g., the wireless device 120a-120e, 200, 320, 401, 415, 502, 502A, 502B, 1201, 1501), an example of which is illustrated in FIG. 20 in the form of a smartphone 2000. With reference to FIGS. 1-20, the smartphone 2000 may include a first SOC 202 (e.g., a SOC-CPU) coupled to a second SOC 204 (e.g., a 5G capable SOC). The first and second SOCs 202, 204 may be coupled to internal memory 2006, 2016, a display 2012, and to a speaker 2014. Additionally, the smartphone 2000 may include an antenna 2004 for sending and receiving electromagnetic radiation that may be connected to a wireless data link and/or cellular telephone transceiver 2008 coupled to one or more processors in the first and/or second SOCs 202, 204. Smartphones 2000 typically also include menu selection buttons or rocker switches 2020 for receiving user inputs.

A typical smartphone 2000 also includes a sound encoding/decoding (CODEC) circuit 2010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 2008 and CODEC circuit 2010 may include a digital signal processor (DSP) circuit (not shown separately).

The processors of the wireless network device 1900 and the smart phone 2000 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 2006, 2016 before they are accessed and loaded into the processor. The processors may include internal memory sufficient to store the application software instructions As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any an example embodiment. For example, one or more of the operations of the methods 600, 700, 800, 900, 1000, 1100, 1300, 1400, 1600, and/or 1700 may be substituted for or combined with one or more operations of the methods 600, 700, 800, 900, 1000, 1100, 1300, 1400, 1600, and/or 1700.

Implementation examples are described in the following paragraphs. While some of the following implementation examples are described in terms of example methods, further example implementations may include: the example methods discussed in the following paragraphs implemented by a wireless device or network device including an apparatus with a processing system configured with processor-executable instructions to perform operations of the methods of the following implementation examples; the example methods discussed in the following paragraphs implemented by a wireless device or network device including means for performing functions of the methods of the following implementation examples; and the example methods discussed in the following paragraphs may be implemented as a non-transitory processor-readable storage medium having stored thereon processor-executable instructions configured to cause a processor of a wireless device or network device to perform the operations of the methods of the following implementation examples.

Example 1

A method for supporting application level discovery of Radio Access Network (RAN) statistics or events, including: sending, from an application processor of a wireless device to a modem processor of the wireless device, a query for one or more RAN statistics or events of interest; receiving, at the application processor, a RAN statistics or events message including one or more RAN statistics or events of interest from the modem processor; and controlling, by the application processor, an output of application data from the application processor to the modem processor based at least in part on the received RAN statistics or events.

Example 2

A method for supporting application level discovery of Radio Access Network (RAN) statistics or events, including: receiving, at a modem processor of a wireless device, a query for one or more RAN statistics or events of interest from an application processor of the wireless device; generating, by the modem processor, a RAN statistics or events message including one or more RAN statistics or events of interest based at least in part on the received query; and sending, from the modem processor, the RAN statistics or events message including the one or more RAN statistics or events of interest to the application processor.

Example 3

The method of any of examples 1 or 2, in which the one or more RAN statistics or events of interest include a delay indication, a delay jitter indication, a packet loss rate, a handover event, a data rate, an available data rate, a recommended bit rate, a radio link failure, a discontinuous reception event, or a service interruption.

Example 4

The method of any of examples 1 or 2, in which the one or more RAN statistics or events of interest include a loss or delay of an application layer packet of a particular type.

Example 5

The method of any of examples 2-4, further including receiving, at the modem processor, a RAN statistics or event message from a network device.

Example 6

The method of example 5, in which the RAN statistics or event message received from the network device is a packet loss report, a packet delay report, a packet delay jitter report, a packet delay variation report, a bit rate report, or a network event message.

Example 7

The method of example 5, in which the RAN statistics or event message received from the network device is a recommended bit rate message including a time interval during which a recommended bit rate is valid.

Example 8

The method of example 5, in which the RAN statistics or event message received from the network device is an uplink (UL) per-packet loss report.

Example 9

The method of example 8, in which the UL per-packet loss report indicates a type of lost packet and a sequence number of each lost packet.

Example 10

A method for supporting application level signaling of Quality of Service (QoS) requirements, including: sending, from an application processor of a wireless device to a modem processor of the wireless device, a QoS requirements message indicating determined QoS requirements for an application running on the application processor; and receiving, at the application processor, a response from the modem processor indicating achieved QoS metrics.

Example 11

The method of example 10, in which the QoS requirements are determined based at least in part on a model mapping a set of QoS metrics to a Quality of Experience (QoE) associated with a target QoE.

Example 12

A method for supporting application level signaling of Quality of Service (QoS) requirements, including: receiving, at a modem processor of a wireless device, a QoS requirements message from an application processor of the wireless device indicating determined QoS requirements for an application running on the application processor; translating, by the modem processor, the QoS requirements indicated in the QoS requirements message to performance metrics; and controlling, by the modem processor, a wireless protocol stack running on the modem processor to implement the performance metrics.

Example 13

The method of example 12, further including: determining, by the modem processor, whether any of the performance metrics are associated with a network device; and sending, from the modem processor, an indication of performance metrics to the network device in response to determining that any of the performance metrics are associated with the network device.

Example 14

The method of examples 12 or 13, further including: determining, by the modem processor, achieved QoS metrics in response to controlling the wireless protocol stack running on the modem processor to implement the performance metrics; and sending, from the modem processor, a response to the application processor of the wireless device indicating the achieved QoS metrics.

Example 15

The method of any of examples 10-14, in which the QoS requirements indicated in the QoS requirements message include a volume of data, a maximum bit rate, an average bit rate, a maximum delay, an average delay, a maximum delay jitter, an average of an absolute value of a delay jitter, a maximum packet loss rate, or an average packet loss rate.

Example 16

A method performed by a processor of a network device of a Radio Access Network (RAN) for supporting application level discovery of RAN statistics or events, including: generating a RAN statistics or event message; and sending the RAN statistics or event message to a wireless device in communication with the network device.

Example 17

The method of example 16, in which the RAN statistics or event message is a packet loss report, a packet delay report, a packet delay jitter report, a packet delay variation report, a bit rate report, or a network event message.

Example 18

The method of example 16, in which the RAN statistics or event message is a recommended bit rate message including a time interval during which a recommended bit rate is valid.

Example 19

The method of example 16, in which the RAN statistics or event message is an uplink (UL) per-packet loss report.

Example 20

The method of example 19, in which the UL per-packet loss report indicates a type of lost packet and a sequence number of each lost packet.

Example 21

The method of any of examples 16-20, in which the RAN statistics or event message is a Media Access Control (MAC) Control Element (CE) (MAC CE).

Example 22

The method of any of examples 15-21, further including: receiving an indication of performance metrics from a wireless device; determining whether the performance metrics are acceptable; implementing the performance metrics in response to determining that the performance metrics are acceptable; and sending an indication of the performance metrics implementation to the wireless device in response to implementing the performance metrics.

Example 23

A method for supporting application level discovery of Radio Access Network (RAN) statistics or events, including: sending, from an application processor of a first wireless device to a second wireless device remote from the first wireless device, a RAN information request indicting one or more RAN statistics or events of interest; receiving, at the application processor, a RAN statistics or events message including one or more RAN statistics or events of interest from the remote second wireless device; and controlling, by the application processor, an output of application data from the application processor based at least in part on the received RAN statistics or events.

Example 24

A method for supporting application level discovery of Radio Access Network (RAN) statistics or events, including: receiving, at an application processor of a first wireless device, a RAN information request indicting one or more RAN statistics or events of interest to a remote second wireless device; sending, from the application processor of the first wireless device to a modem processor of the first wireless device, a query for the one or more RAN statistics or events of interest; receiving, at the application processor of the first wireless device from the modem processor of the first wireless device, a RAN statistics or events message including one or more RAN statistics or events of interest; and sending, from the application processor of the first wireless device to the remote second wireless device, a RAN statistics or events message including the one or more RAN statistics or events of interest.

Example 25

The method of any of examples 23 or 22, in which the one or more RAN statistics or events of interest include a delay indication, a delay jitter indication, a packet loss rate, a handover event, a data rate, an available data rate, a recommended bit rate, a radio link failure, a discontinuous reception event, or a service interruption.

Example 26

The method of any of examples 23 or 22, in which the one or more RAN statistics or events of interest include a loss or delay of an application layer packet of a particular type.

Example 27

A method for supporting application level signaling of Quality of Service (QoS) requirements, including: sending, from an application processor of a first wireless device to a second wireless device remote from the first wireless device, a QoS requirements message indicating determined QoS requirements for an application running on a processor of the second wireless device; and receiving, at the application processor of the first wireless device, a response from the second wireless device indicating QoS metrics achieved by the second wireless device.

Example 28

A method for supporting application level signaling of Quality of Service (QoS) requirements, including: receiving, at an application processor of a first wireless device, a QoS requirements message indicating determined QoS requirements for an application running on the application processor from a second wireless device; sending, from the application processor of the first wireless device to a modem processor of the first wireless device, a QoS requirements message indicating the determined QoS requirements; receiving, at the application processor of the first wireless device, a response from the modem processor of the first wireless device indicating achieved QoS metrics; and sending, from the application processor of the first wireless device, a response to the second wireless device indicating the achieved QoS metrics.

Example 29

The method of examples 27 or 28, in which the determined QoS requirements include a volume of data, a maximum bit rate, an average bit rate, a maximum delay, an average delay, a maximum delay jitter, an average of an absolute value of a delay jitter, a maximum packet loss rate, or an average packet loss rate.

Example 1

A method performed by a wireless device, including: sending, from an application processor of the wireless device to a modem processor of the wireless device, a query for one or more RAN statistics or events of interest; receiving, at a modem processor, the query for one or more RAN statistics or events of interest from the application processor of the wireless device; generating, by the modem processor, a RAN statistics or events message including one or more RAN statistics or events of interest based at least in part on the received query; sending, from the modem processor, the RAN statistics or events message including the one or more RAN statistics or events of interest to the application processor; receiving, at the application processor, the RAN statistics or events message from the modem processor; and controlling an output of application data from the application processor to the modem processor based at least in part on the received RAN statistics or events.

Example 2

The method of example 1, in which the one or more RAN statistics or events of interest include a delay indication, a delay jitter indication, a packet loss rate, a handover event, a data rate, an available data rate, a recommended bit rate, a radio link failure, a discontinuous reception event, a service interruption, or a loss or delay of an application layer packet of a particular type.

Example 3

The method of either of examples 1 or 2, further including receiving in the modem processor from a network device a packet loss report, a packet delay report, a packet delay jitter report, a packet delay variation report, a bit rate report, or a network event message.

Example 4

The method of any of examples 1-3, further including receiving in the modem processor from a network device a recommended bit rate message including a time interval during which a recommended bit rate is valid.

Example 5

The method of any of examples 1-3, further including receiving in the modem processor from a network device an uplink (UL) per-packet loss report that indicates a type of lost packet and a sequence number of each lost packet.

Example 6

The method of any of examples 1-3, further including: determining by the application processor QoS requirements for an application running on the application processor based at least in part on a model mapping a set of QoS metrics to a QoE associated with a target QoE; sending a QoS requirements message indicating the determined QoS requirements from the application processor to the modem processor; translating, by the modem processor, the QoS requirements indicated in the QoS requirements message to performance metrics; and controlling, by the modem processor, a wireless protocol stack running on the modem processor to implement the performance metrics.

Example 7

The method of example 6, further including: determining, by the modem processor, whether any of the performance metrics are associated with a network device; and sending, from the modem processor, an indication of performance metrics to the network device in response to determining that any of the performance metrics are associated with the network device.

Example 8

The method of example 6, further including: determining, by the modem processor, achieved QoS metrics in response to controlling the wireless protocol stack running on the modem processor to implement the performance metrics; and sending, from the modem processor, a response to the application processor of the wireless device indicating the achieved QoS metrics.

Example 9

The method of example 6, in which the QoS requirements indicated in the QoS requirements message include a volume of data, a maximum bit rate, an average bit rate, a maximum delay, an average delay, a maximum delay jitter, an average of an absolute value of a delay jitter, a maximum packet loss rate, or an average packet loss rate.

Example 10

A method performed by a first wireless device for managing communications with a second wireless device, the method including: establishing an application level interface with an application of a second wireless device; obtaining in an application processor of the first wireless device from a modem processor of the first wireless device information regarding one or more RAN statistics or events of interest; and taking an action by the application processor to adapt communications with the second wireless device based on the information regarding one or more RAN statistics or events of interest.

Example 11

The method of example 10, in which: obtaining in an application processor of the first wireless device from a modem processor of the first wireless device information regarding one or more RAN statistics or events of interest includes: sending by the application processor via the modem processor to the second wireless device, a RAN information request indicting one or more RAN statistics or events of interest; and receiving, at the application processor via the modem, a RAN statistics or events message including one or more RAN statistics or events of interest from the second wireless device; and taking an action by the application processor to adapt communications with the second wireless device based on the information regarding one or more RAN statistics or events of interest includes controlling, by the application processor, an output of application data from the application processor based at least in part on the received RAN statistics or events.

Example 12

The method of either of examples 10 or 11, in which the one or more RAN statistics or events of interest include a delay indication, a delay jitter indication, a packet loss rate, a handover event, a data rate, an available data rate, a recommended bit rate, a radio link failure, a discontinuous reception event, a service interruption, or a loss or delay of an application layer packet of a particular type.

Example 13

The method of example 10, in which the one or more RAN statistics or events of interest includes QoS requirements for an application running on an application processor of the second wireless device, the QoS requirements including a volume of data, a maximum bit rate, an average bit rate, a maximum delay, an average delay, a maximum delay jitter, an average of an absolute value of a delay jitter, a maximum packet loss rate, or an average packet loss rate.

Example 14

The method of example 10, in which: obtaining in an application processor of the first wireless device from a modem processor of the first wireless device information regarding one or more RAN statistics or events of interest includes: receiving, in the application processor via the modem processor, a RAN information request from the second wireless device, the RAN information request indicting one or more RAN statistics or events of interest; sending, from the application processor to the modem processor, a query for the one or more RAN statistics or events of interest; and receiving, by the application processor from the modem processor, a RAN statistics or events message including one or more RAN statistics or events of interest; and taking an action by the application processor to adapt communications with the second wireless device based of the information regarding one or more RAN statistics or events of interest includes sending, from the application processor via the modem processor to the second wireless device, a RAN statistics or events message including the one or more RAN statistics or events of interest.

Example 15

The method of example 14, in which the one or more RAN statistics or events of interest include a delay indication, a delay jitter indication, a packet loss rate, a handover event, a data rate, an available data rate, a recommended bit rate, a radio link failure, a discontinuous reception event, a service interruption or a loss or delay of an application layer packet of a particular type.

Example 16

The method of examples 15, in which the one or more RAN statistics or events of interest include QoS requirements for an application running on an application processor of the second wireless device, the QoS requirements including a volume of data, a maximum bit rate, an average bit rate, a maximum delay, an average delay, a maximum delay jitter, an average of an absolute value of a delay jitter, a maximum packet loss rate, or an average packet loss rate.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a wireless device, comprising:
sending, from an application processor of the wireless device to a modem processor of the wireless device, a query for one or more RAN statistics or events of interest;

receiving, at a modem processor, the query for one or more RAN statistics or events of interest from the application processor of the wireless device;
generating, by the modem processor, a RAN statistics or events message including one or more RAN statistics or events of interest based at least in part on the received query;
sending, from the modem processor, the RAN statistics or events message including the one or more RAN statistics or events of interest to the application processor;
receiving, at the application processor, the RAN statistics or events message from the modem processor;
controlling an output of application data from the application processor to the modem processor based at least in part on the received RAN statistics or events;
determining by the application processor Quality of Service (QOS) requirements for an application running on the application processor based at least in part on a model mapping a set of QoS metrics to a Quality of Experience (QoE) associated with a target QoE;
sending a QoS requirements message indicating the determined QoS requirements from the application processor to the modem processor;
translating, by the modem processor, the QoS requirements indicated in the QoS requirements message to performance metrics; and
controlling, by the modem processor, a wireless protocol stack running on the modem processor to implement the performance metrics.

2. The method of claim 1, wherein the one or more RAN statistics or events of interest comprise a delay indication, a delay jitter indication, a packet loss rate, a handover event, a data rate, an available data rate, a recommended bit rate, a radio link failure, a discontinuous reception event, a service interruption, or a loss or delay of an application layer packet of a particular type.

3. The method of claim 1, further comprising receiving in the modem processor from a network device a packet loss report, a packet delay report, a packet delay jitter report, a packet delay variation report, a bit rate report, or a network event message.

4. The method of claim 1, further comprising receiving in the modem processor from a network device a recommended bit rate message including a time interval during which a recommended bit rate is valid.

5. The method of claim 1, further comprising receiving in the modem processor from a network device an uplink (UL) per-packet loss report that indicates a type of lost packet and a sequence number of each lost packet.

6. The method of claim 1, further comprising:
determining, by the modem processor, whether any of the performance metrics are associated with a network device; and
sending, from the modem processor, an indication of performance metrics to the network device in response to determining that any of the performance metrics are associated with the network device.

7. The method of claim 1, further comprising:
determining, by the modem processor, achieved QoS metrics in response to controlling the wireless protocol stack running on the modem processor to implement the performance metrics; and
sending, from the modem processor, a response to the application processor of the wireless device indicating the achieved QoS metrics.

8. The method of claim 1, wherein the QoS requirements indicated in the QoS requirements message comprise a volume of data, a maximum bit rate, an average bit rate, a maximum delay, an average delay, a maximum delay jitter, an average of an absolute value of a delay jitter, a maximum packet loss rate, or an average packet loss rate.

9. A wireless device, comprising:
a wireless transceiver;
an application processor; and
a modem processor coupled to the application processor and the wireless transceiver,
wherein the application processor and modem processor are configured to:
send from the application processor to the modem processor a query for one or more RAN statistics or events of interest;
receive at the modem processor the query for one or more RAN statistics or events of interest;
generate, by the modem processor, a RAN statistics or events message including one or more RAN statistics or events of interest based at least in part on the received query;
send, from the modem processor, the RAN statistics or events message including the one or more RAN statistics or events of interest to the application processor;
receive, at the application processor, the RAN statistics or events message from the modem processor;
control an output of application data from the application processor to the modem processor based at least in part on the received RAN statistics or events;
determine Quality of Service (QOS) requirements for an application running on the application processor based at least in part on a model mapping a set of QoS metrics to a Quality of Experience (QoE) associated with a target QoE; and
send a QoS requirements message indicating the determined QoS requirements from the application processor to the modem processor; and
the modem processor is further configured to:
translate the QoS requirements indicated in the QoS requirements message to performance metrics; and
control a wireless protocol stack running on the modem processor to implement the performance metrics.

10. The wireless device of claim 9, wherein the one or more RAN statistics or events of interest comprise a delay indication, a delay jitter indication, a packet loss rate, a handover event, a data rate, an available data rate, a recommended bit rate, a radio link failure, a discontinuous reception event, a service interruption, or a loss or delay of an application layer packet of a particular type.

11. The wireless device of claim 9, wherein the application processor and modem processor are further configured to receive from a network device a packet loss report, a packet delay report, a packet delay jitter report, a packet delay variation report, a bit rate report, or a network event message.

12. The wireless device of claim 9, wherein the application processor and modem processor are further configured to receive from a network device a recommended bit rate message including a time interval during which a recommended bit rate is valid.

13. The wireless device of claim 9, wherein the application processor and modem processor are further configured to receive from a network device an uplink (UL) per-packet loss report that indicates a type of lost packet and a sequence number of each lost packet.

14. The wireless device of claim 9, wherein the application processor and modem processor are further configured to:
   determine whether any of the performance metrics are associated with a network device; and
   send an indication of performance metrics to the network device in response to determining that any of the performance metrics are associated with the network device.

15. The wireless device of claim 9, wherein the application processor and modem processor are further configured to:
   determine achieved QoS metrics in response to controlling the wireless protocol stack running on the modem processor to implement the performance metrics; and
   send a response to the application processor of the wireless device indicating the achieved QoS metrics.

16. The wireless device of claim 9, wherein the QoS requirements indicated in the QoS requirements message comprise a volume of data, a maximum bit rate, an average bit rate, a maximum delay, an average delay, a maximum delay jitter, an average of an absolute value of a delay jitter, a maximum packet loss rate, or an average packet loss rate.

* * * * *